US011967108B2

(12) United States Patent
Kohata

(10) Patent No.: US 11,967,108 B2
(45) Date of Patent: *Apr. 23, 2024

(54) COMPUTER-READABLE RECORDING MEDIUM STORING POSITION IDENTIFICATION PROGRAM, POSITION IDENTIFICATION METHOD, AND INFORMATION PROCESSING APPARATUS

(71) Applicant: FUJITSU LIMITED, Kawasaki (JP)

(72) Inventor: Shun Kohata, Setagaya (JP)

(73) Assignee: FUJITSU LIMITED, Kawasaki (JP)

(*) Notice: Subject to any disclaimer, the term of this patent is extended or adjusted under 35 U.S.C. 154(b) by 365 days.

This patent is subject to a terminal disclaimer.

(21) Appl. No.: 17/475,982

(22) Filed: Sep. 15, 2021

(65) Prior Publication Data

US 2022/0215577 A1  Jul. 7, 2022

(30) Foreign Application Priority Data

Jan. 7, 2021 (JP) ................................. 2021-001755

(51) Int. Cl.
- *G06K 9/00* (2022.01)
- *G06T 7/50* (2017.01)
- *G06T 7/73* (2017.01)
- *G06V 20/00* (2022.01)

(52) U.S. Cl.
CPC .................. *G06T 7/74* (2017.01); *G06T 7/50* (2017.01); *G06V 20/00* (2022.01); *G06T 2207/20081* (2013.01)

(58) Field of Classification Search
None
See application file for complete search history.

(56) References Cited

U.S. PATENT DOCUMENTS 9,297,641 B2 *  3/2016  Stein ...................... G06V 20/58
2017/0176990 A1 *  6/2017  Keller ..................... G01S 17/42

FOREIGN PATENT DOCUMENTS

WO  2020/031812 A1  2/2020

OTHER PUBLICATIONS

Larson et al., "Lidar based off-road negative obstacle detection and analysis", Oct. 2011 (Year: 2011).*

* cited by examiner

*Primary Examiner* — Soo Jin Park
(74) *Attorney, Agent, or Firm* — Fujitsu Intellectual Property Center

(57) ABSTRACT

A recording medium stores a program for causing a computer to execute processing including acquiring a captured image and a depth image that represents a distance from an imaging position, identifying a road region and another region in contact with the road region from the captured image, calculating a change in a depth of a first region that corresponds to the road region and a change in a depth of a second region that corresponds to the another region included in the depth image, determining whether or not the another region is a detection target based on the change in the depth of the first region and the change in the depth of the second region, and identifying a position of a subject included in the another region based on the depth of the second region and the imaging position when the another region is the detection target.

8 Claims, 20 Drawing Sheets

FIG. 4
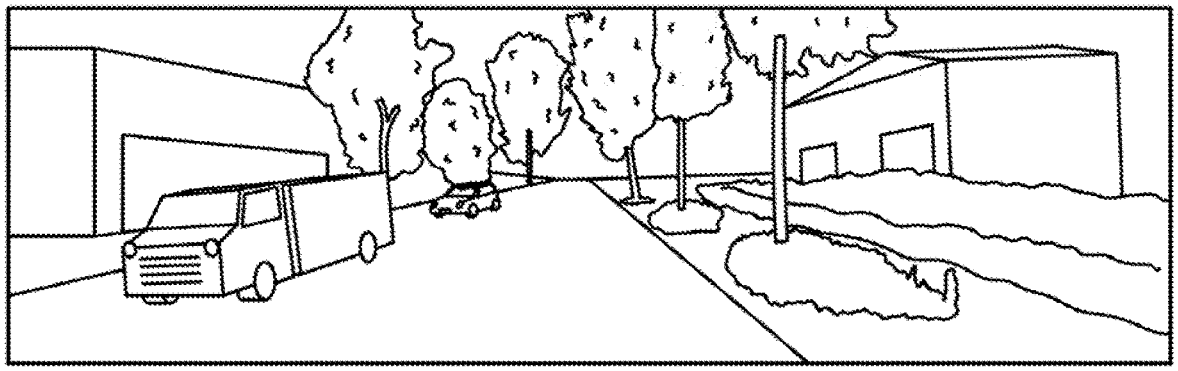
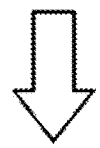 LiDAR or DEPTH ESTIMATION MODEL
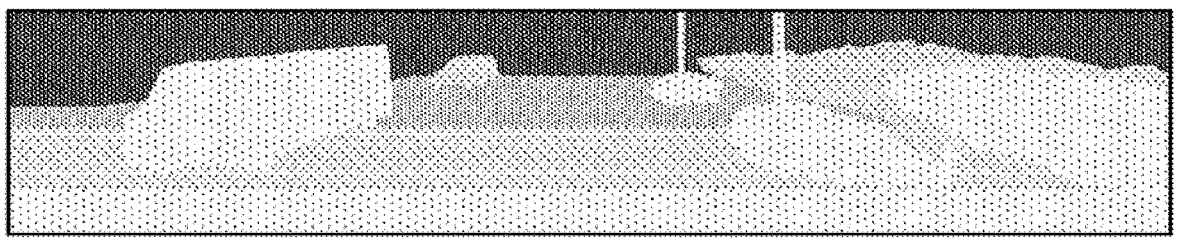

FIG. 12B
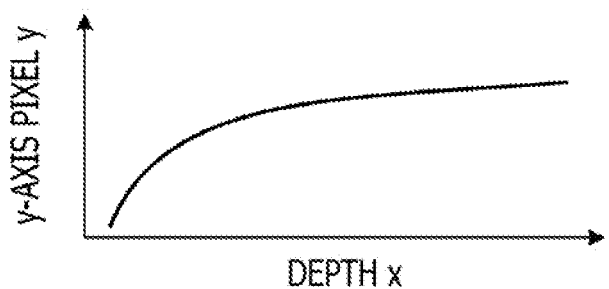
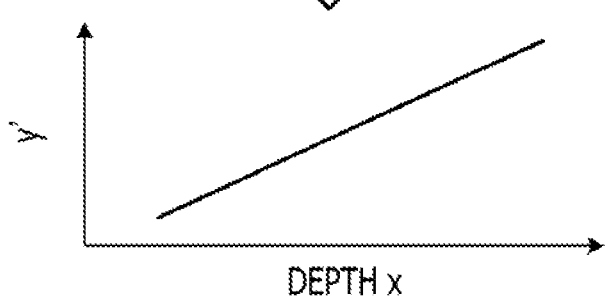
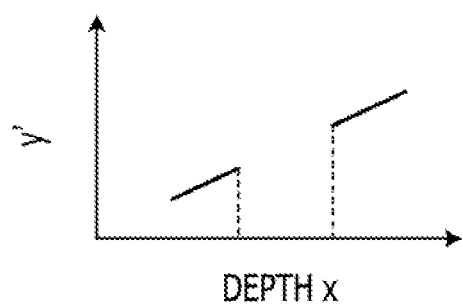
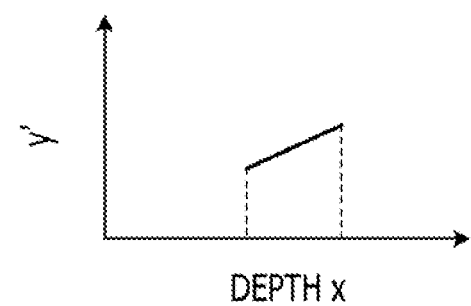

COMPUTER-READABLE RECORDING MEDIUM STORING POSITION IDENTIFICATION PROGRAM, POSITION IDENTIFICATION METHOD, AND INFORMATION PROCESSING APPARATUS

CROSS-REFERENCE TO RELATED APPLICATION

This application is based upon and claims the benefit of priority of the prior Japanese Patent Application No. 2021-1755, filed on Jan. 7, 2021, the entire contents of which are incorporated herein by reference.

FIELD

The embodiments discussed herein are related to a technique for identifying a position of a subject.

BACKGROUND

In recent years, areas devastated by large-scale earthquakes and typhoons are vast. Therefore, not only mutual assistance by governments, medical institutions, or the like but also mutual assistance between local residents is seemed to be important. Therefore, a mutual assistance support tool or the like at the time of evacuation using a terminal such as a smartphone is used.

International Publication Pamphlet No. WO 2020/31812 is disclosed as related art.

SUMMARY

According to an aspect of the embodiments, a non-transitory computer-readable recording medium stores a position identification program for causing a computer to execute processing Including acquiring a captured image and a depth image that represents a distance from an Imaging position and corresponds to the captured image, identifying a road region and another region in contact with the road region from the captured image, calculating a change in a depth of a first region that corresponds to the road region included in the depth image and a change in a depth of a second region that corresponds to the another region included in the depth image, determining whether or not the another region is a detection target on the basis of the change in the depth of the first region and the change in the depth of the second region, and identifying a position of a subject included in the another region on the basis of the depth of the second region and the imaging position in a case where it is determined that the another region is the detection target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining photographic depth estimation according to the first embodiment;

FIG. 12B is a diagram (2) for explaining the obstacle determination according to the second embodiment;

DESCRIPTION OF EMBODIMENTS

For example, in a case where each evacuee faces a place where it is difficult for the evacuee to pass due to fire, collapse of a building, flooding, or the like, each evacuee captures a photograph of an obstacle (devastated place) using the mutual assistance support tool of the terminal and uploads the captured photograph to a server together with position information of the smartphone at that time. The server generates disaster information including map information in which the image of the obstacle is attached to the devastated place using the images of the obstacle collected from each disaster victim and the position information. Each evacuee evacuates through a route avoiding the devastated place while browsing the disaster information generated by the server using the mutual assistance support tool of the terminal.

However, with the above technique, a position of the obstacle that is the subject imaged by the terminal is deviated from a position of the terminal, and there is a case where the devastated place is not accurate.

Specifically, for example, because an evacuee images an obstacle from a place apart from the obstacle, an actual position of the obstacle is slightly deviated from the position acquired using the Global Positioning System (GPS) of the terminal. Therefore, in the disaster information generated by the server, the obstacle is mapped at a position different from the actual position. Therefore, there is a possibility that this causes each evacuee to determine a wrong evacuation route.

In one aspect, an object is to provide a position identification program, a position identification method, and an information processing apparatus that can accurately identify a position of a subject.

Hereinafter, embodiments of a position identification program, a position identification method, and an information processing apparatus will be described in detail with reference to the drawings. Note that the embodiments do not limit the present invention. Furthermore, each of the embodiments may be appropriately combined within a range without inconsistency.

Figure 1:
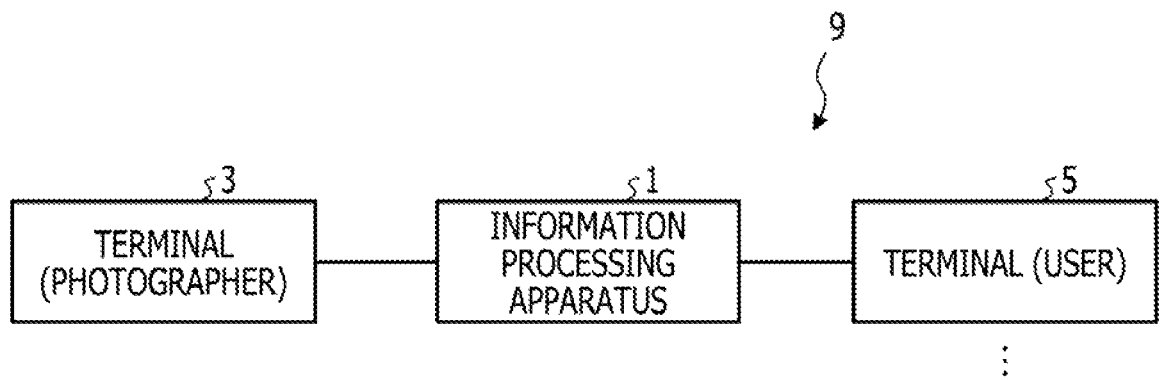
FIG. 1 is a functional block diagram illustrating a functional configuration of a position identification system according to a first embodiment.

FIG. 1 is a functional block diagram illustrating a functional configuration of a position identification system according to a first embodiment. A position identification system 9 includes an information processing apparatus 1, a terminal 3, and a terminal 5.

The terminal 3 is a terminal of an evacuee who takes a photograph of an obstacle (devastated place) through an evacuation assistance application in a case where the evacuee faces a road through which it is difficult for the evacuee to pass at the time of a disaster. The terminal 3 has a GPS function, an electronic compass (magnetic sensor), and the like in addition to an imaging function, a communication function, an operation function, and a display function. The terminal 3 can acquire a position where a photograph is imaged using the GPS and can acquire an imaging direction using the electronic compass. The terminal 3 is, for example, a smartphone with a GPS and an electronic compass. Note that the evacuation assistance application is an example of a mutual assistance support tool at the time of evacuation.

The terminal 5 is a terminal of an evacuee and is a terminal of an evacuee who uses the evacuation assistance application. The terminal 5 has the functions similar to those of the terminal 3. The terminal 5 is, for example, a smartphone.

When acquiring a photograph of a devastated place imaged by a photographer, a position where the photograph is imaged, and an imaging direction from the terminal 3, the information processing apparatus 1 identifies a road corresponding to the imaging direction from the photograph on a map of the evacuation assistance application. Then, the information processing apparatus 1 estimates a depth of the photograph using a depth estimation model that has learned Light Detection and Ranging (LiDAR) data, for example. Then, the information processing apparatus 1 identifies a position of an obstacle indicating the devastated place on the road from the position where the photograph is imaged and the depth of the road in the photograph.

That is, for example, although the position where the photograph is imaged deviates from the position of the devastated place on the imaged road, the information processing apparatus 1 identifies the position of the devastated place by correcting the deviation. Then, the information processing apparatus 1 displays the imaged photograph at the estimated position on the map of the evacuation assistance application. Here, the reason why the road is set as the devastated place is because roads are used as evacuation routes at the time of a disaster. When a road that is difficult to pass exists at the time of a disaster, the road hinders quick evacuation. Therefore, the information processing apparatus 1 accurately estimates the position of the obstacle indicating the devastated place on the road. As a result, the information processing apparatus 1 can share a damage situation from the Imaged photograph with local residents who use the evacuation assistance application and can assist evacuation more safely.

Figure 2:
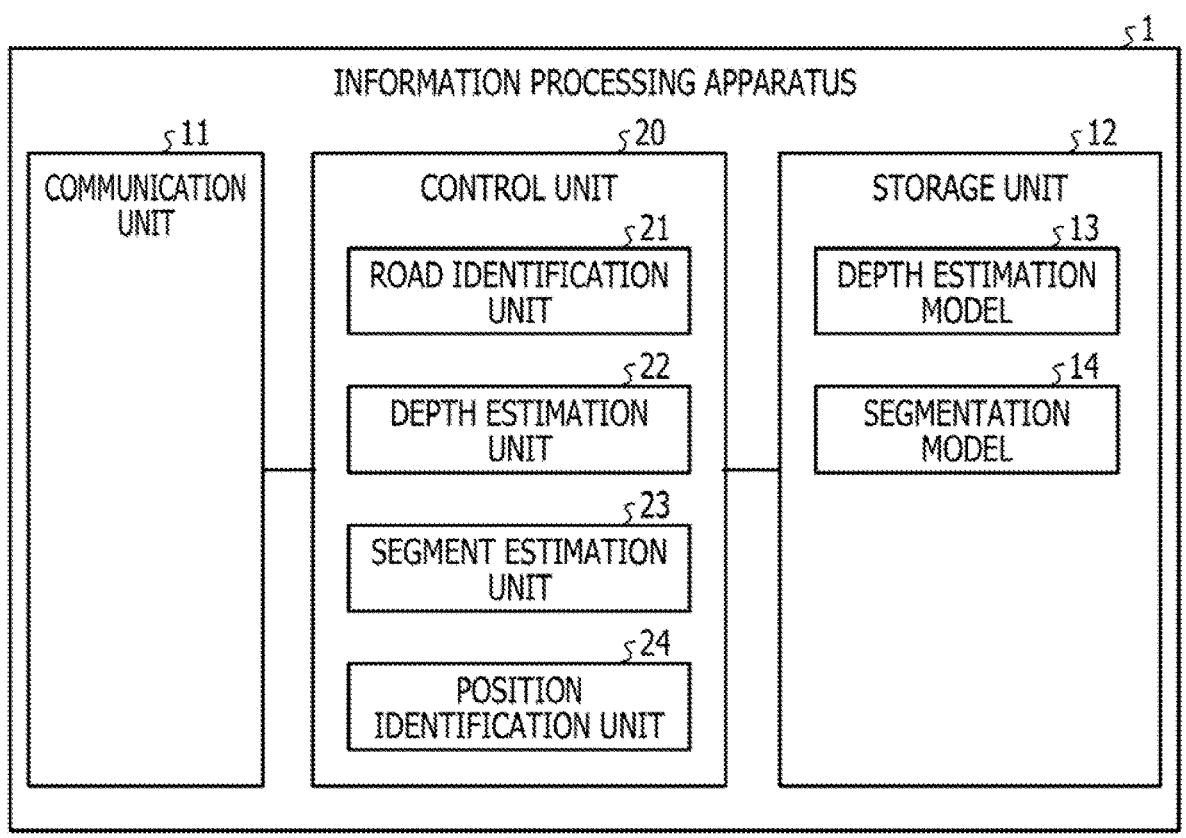
FIG. 2 is a functional block diagram illustrating a functional configuration of an information processing apparatus according to the first embodiment.

FIG. 2 is a functional block diagram illustrating a functional configuration of an information processing apparatus according to the first embodiment. As illustrated in FIG. 2, the information processing apparatus 1 includes a communication unit 11, a storage unit 12, and a control unit 20. The communication unit 11 controls communication with another device. For example, the communication unit 11 receives the photograph of the devastated place (obstacle), the position where the photograph is imaged, and the imaging direction from the terminal 3. Furthermore, the communication unit 11 transmits the map of the evacuation assistance application on which the estimated position of the obstacle is written to the terminal 3 and the terminal 5.

The storage unit 12 stores various types of data, programs executed by the control unit 20, or the like. For example, the storage unit 12 stores a depth estimation model 13 and a segmentation model 14.

The depth estimation model 13 is a machine learning model that estimates a depth and is a machine learning model that is generated through machine learning using "Red Green Blue (RGB) image data and LiDAR data" as training data "data and a label". In other words, for example, the depth estimation model 13 outputs a depth map in the LIDAR according to an input of RGB image data.

The segmentation model 14 is a machine learning model that estimates an image segmentation (semantic segmentation) and is a machine learning model that is generated through machine learning using "RGB image data and segment information" as training data "data and a label". In other words, for example, the segmentation model 14 outputs the segment information according to an input of the RGB Image data. The image segmentation here means to divide segments in an image region. A segment indicates classification (meaning) in the image region. For example, in a case where the RGB image data is a photograph in which a devastated place on a road is imaged, roads, the sky, cars, pedestrians, or the like can be classified as segments. Note that, hereinafter, a photograph may be described as photograph data, RGB image data, or an RGB image.

The control unit 20 is a processing unit that controls the entire information processing apparatus 1 and includes a road identification unit 21, a depth estimation unit 22, a segment estimation unit 23, and a position identification unit 24. The road identification unit 21 identifies a road corresponding to an imaging direction. For example, the road identification unit 21 acquires photograph data, an imaging position, and electronic compass information from the terminal 3. The road identification unit 21 acquires an imaging direction from the electronic compass information. Then, the road identification unit 21 identifies a road corresponding to the imaging direction from the imaging position on the map of the evacuation assistance application.

The depth estimation unit 22 estimates a depth corresponding to the photograph data using the depth estimation model 13. For example, the depth estimation unit 22 inputs the photograph data that is RGB image data into the depth estimation model 13 and outputs a depth map corresponding to the image data from the depth estimation model 13. In other words, for example, the depth estimation unit 22 acquires the depth map that represents a distance from the imaging position of the photograph and corresponds to the captured image. Note that it has been described that the depth estimation unit 22 estimates the depth corresponding to the photograph data using the depth estimation model 13. However, the embodiment is not limited to this. In a case where the terminal 3 or the information processing apparatus 1 has the LiDAR function, the depth estimation unit 22 may use a depth map measured using the LiDAR function.

The segment estimation unit 23 estimates a segment corresponding to the photograph data using the segmentation model 14. For example, the segment estimation unit 23 inputs RGB image data into the segmentation model 14 and estimates segment information including a road from the segmentation model 14.

The position Identification unit 24 identifies a position of a devastated place from the imaging position and the depth of the road. For example, the position identification unit 24 extracts a road segment estimated by the segment estimation unit 23. The position identification unit 24 identifies the position of the devastated place from the imaging position and the depth of the road segment. As an example, the position identification unit 24 estimates a depth of the top of the road segment as a depth of an obstacle. Then, the position identification unit 24 estimates a distance to the obstacle from the imaging position using the depth of the obstacle and identifies the position of the obstacle (devastated place). Then, the position identification unit 24 associates the photograph data (RGB image data) with the identified position on map data of the evacuation application.

Figure 3:
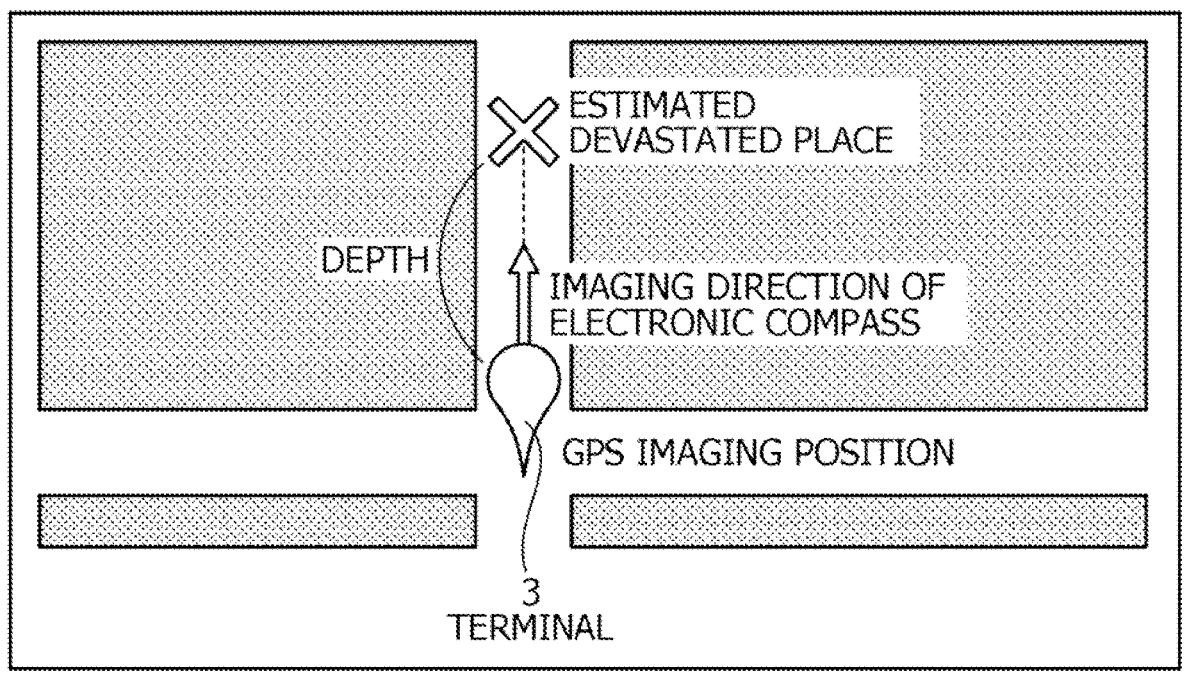
FIG. 3 is a diagram for explaining position identification according to the first embodiment.

FIG. 3 is a diagram for explaining position identification according to the first embodiment. FIG. 3 illustrates an image of a map of an evacuation assistance application. As illustrated in FIG. 3, the road identification unit 21 identifies the road corresponding to the imaging direction of the electronic compass when the devastated place is imaged at the GPS imaging position. The depth estimation unit 22 estimates a depth map corresponding to the captured image of the photograph. The segment estimation unit 23 estimates a road segment corresponding to the captured image of the photograph. The position identification unit 24 estimates the depth (distance) of the devastated place from the GPS imaging position from the GPS imaging position and the depth of the road segment obtained from the depth map. As a result, the position identification unit 24 identifies the position of the devastated place.

FIG. 4 is a diagram for explaining photograph depth estimation according to the first embodiment. As illustrated in FIG. 4, the depth estimation unit 22 inputs RGB image data into the depth estimation model 13 and outputs a depth map corresponding to the RGB image data from the depth estimation model 13. In other words, for example, the depth estimation unit 22 outputs the depth map that represents a distance from the imaging position of the photograph and corresponds to the RGB image data. Note that the depth estimation unit 22 may output the depth map from the RGB image data using the LiDAR function instead of the depth estimation model 13.

Figure 5:
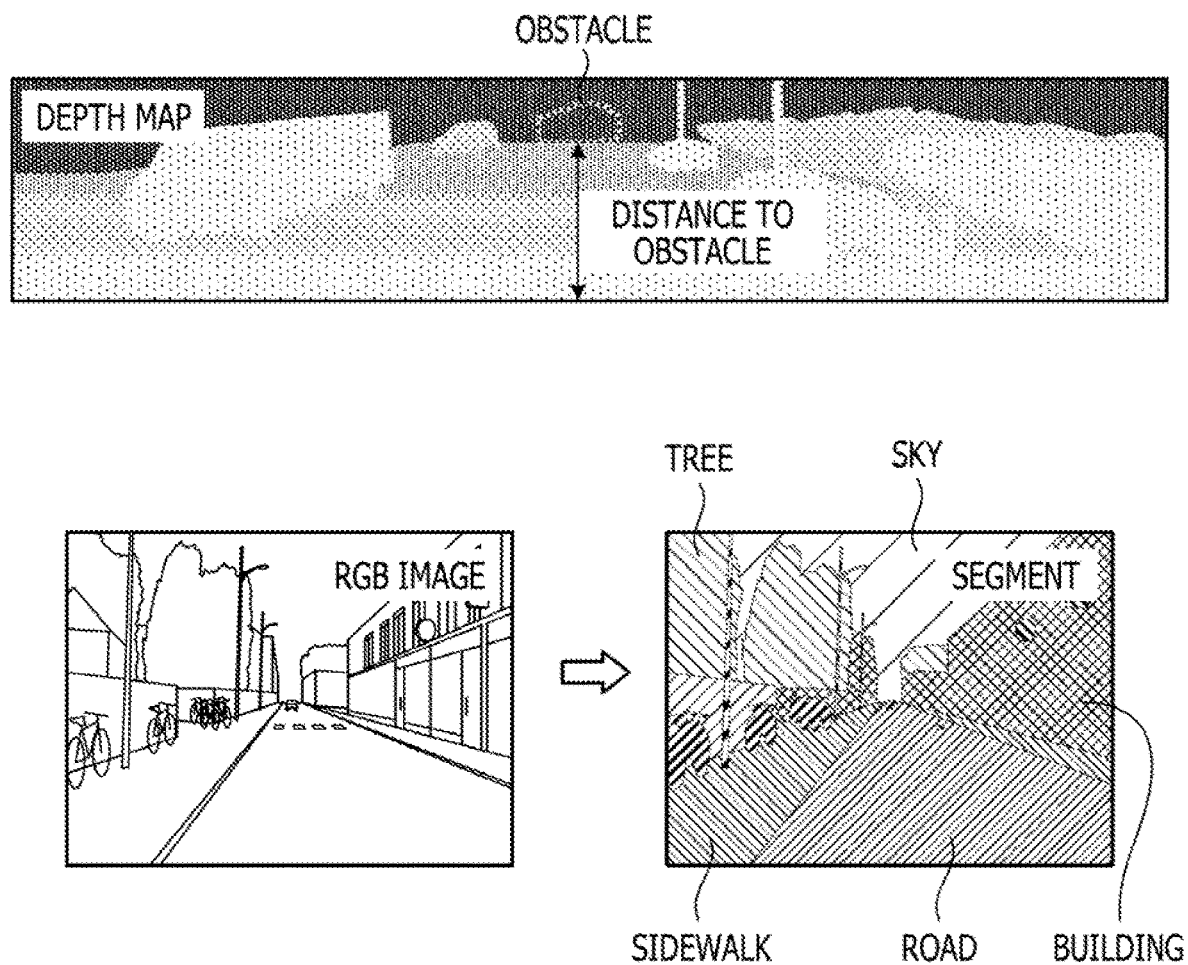
FIG. 5 is a diagram for explaining photographic segment estimation according to the first embodiment.

FIG. 5 is a diagram for explaining photograph segment estimation according to the first embodiment. In the upper figure of FIG. 5, a depth map of RGB image data is illustrated. As illustrated in the upper figure of FIG. 5, a problem is how to extract a distance (depth) to an obstacle from the depth map. For such a problem, the segment estimation unit 23 uses detection of a road using an image segmentation (semantic segmentation). In other words, for example, as illustrated in the lower figure of FIG. 5, the segment estimation unit 23 estimates various segments including roads using the segmentation model 14 from the RGB image data. Here, in addition to a road, a sidewalk, trees, the sky, and buildings are estimated as segments. Then, the segment estimation unit 23 estimates a road segment in which a devastated place exists. Then, the position identification unit 24 estimates, for example, the depth of the top of the road segment as the depth (distance) of the obstacle from the imaging position, from the imaging position and the depth map. Then, the position identification unit 24 adds the imaging position and the estimated distance and identifies the position of the devastated place.

Figure 6:
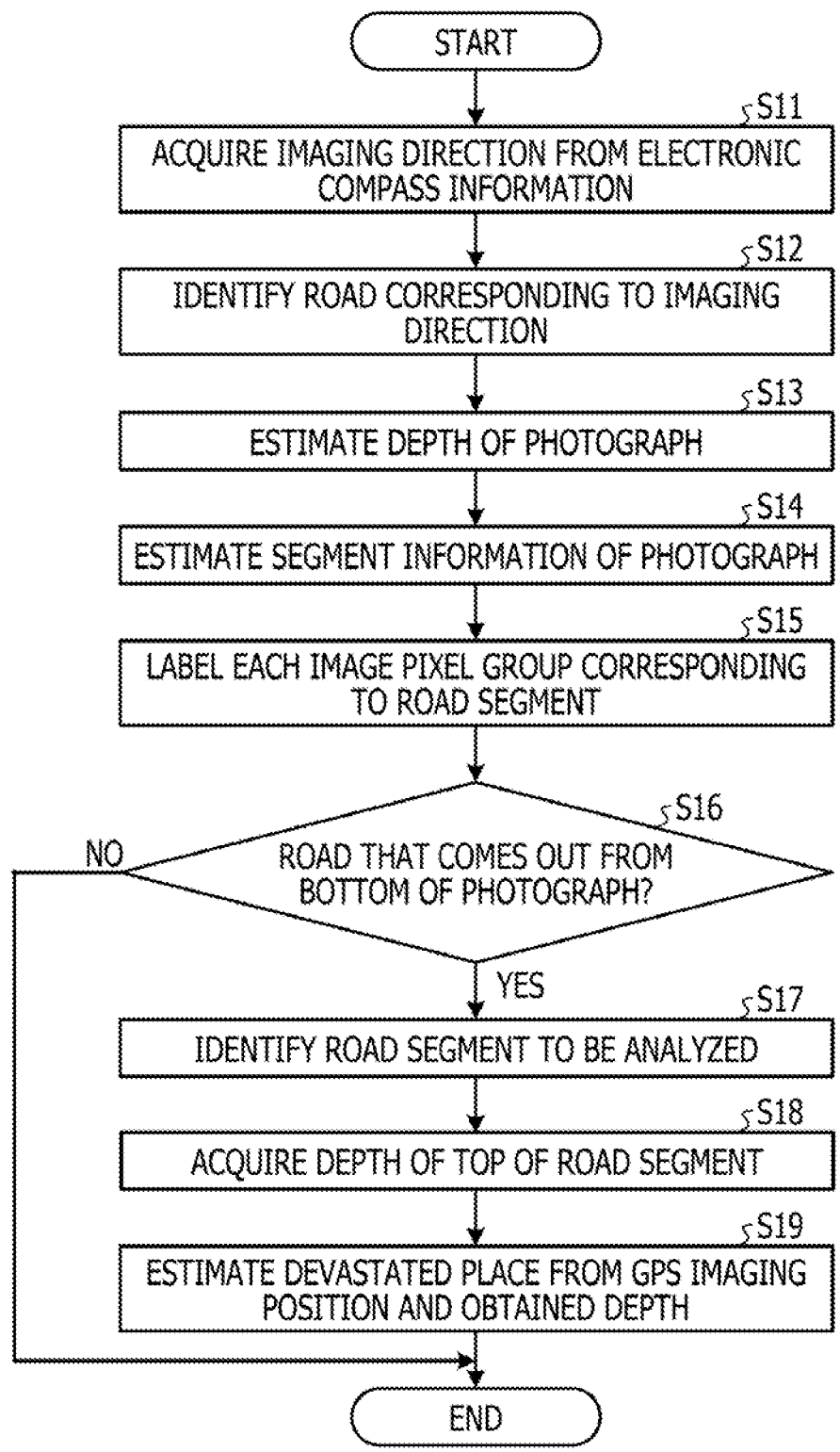
FIG. 6 is a diagram illustrating an example of a flowchart of position identification processing according to the first embodiment.

FIG. 6 is a diagram illustrating an example of a flowchart of position identification processing according to the first embodiment. Note that it is assumed that the information processing apparatus 1 acquire the photograph data, the GPS imaging position, and the electronic compass information of the devastated place from the terminal 3. As illustrated in FIG. 6, the road Identification unit 21 acquires an imaging direction from the electronic compass information (step S11). The road identification unit 21 identifies a road corresponding to the imaging direction (step S12).

Subsequently, the depth estimation unit 22 estimates a depth of the photograph (step S13). For example, the depth estimation unit 22 estimates a depth map of the photograph from the photograph data that is RGB image data using the depth estimation model 13.

Then, the segment estimation unit 23 estimates segment information of the photograph (step S14). For example, the segment estimation unit 23 estimates a segment corresponding to the photograph data that is the RGB image data using the segmentation model 14.

Then, the segment estimation unit 23 labels each image pixel group corresponding to the road segment obtained from the segment information (step S15). For example, the segment estimation unit 23 labels each pixel group (connected region) corresponding to the road segment on the basis of the segment information.

Then, the position Identification unit 24 determines a road that comes out from the bottom of the photograph on the basis of labeling (step S16). For example, the position identification unit 24 extracts an outline of the road segment on the basis of labeling. Then, the position identification unit 24 determines a road segment that comes out from the bottom of the photograph according to the outline of the road segment. In a case where it is determined that no road comes out from the bottom of the photograph (No in step S16), the position identification unit 24 ends the position identification processing.

On the other hand, in a case where it is determined that there is a road that comes out from the bottom of the photograph (Yes in step S16), the position identification unit 24 identifies the road segment that comes out from the bottom of the photograph as a road segment to be analyzed (step S17).

Then, the position identification unit 24 acquires a depth of the top of the road segment (step S18). For example, the position identification unit 24 acquires the depth of the top of the road segment to be analyzed using the depth map. Then, the position identification unit 24 estimates a position of a devastated place from the GPS imaging position and the acquired depth (step S19). Then, the position identification unit 24 ends the position identification processing.

According to the first embodiment described above, the information processing apparatus 1 acquires the captured image and the depth map that represents the distance from the imaging position and corresponds to the captured image. The information processing apparatus 1 identifies a road region using the image segmentation from the captured image. The information processing apparatus 1 identifies the position of the devastated place (obstacle) that exists in the road region on the basis of the depth of the road region obtained from the depth map and the imaging position. According to such a configuration, the information processing apparatus 1 can accurately identify disaster information by using the imaging position and the depth of the road region.

By the way, in the first embodiment, a case has been described where the information processing apparatus 1 uses the depth of the top of the road segment as the depth of the devastated place (obstacle). However, at the time of a disaster, obstacles such as collapsed buildings or depressions may exist in a part of roads. In a case where the obstacle exists in a part of the road, in the segmentation, a road segment connecting from the obstacle to the front side of the obstacle is detected. Furthermore, in the segmentation, another segment may be detected on the road segment due to noise. There is a case where it is difficult to determine where an obstacle is positioned in a case where the obstacle exists in a part of the road or a case where another segment is detected on the road segment.

Figure 7:
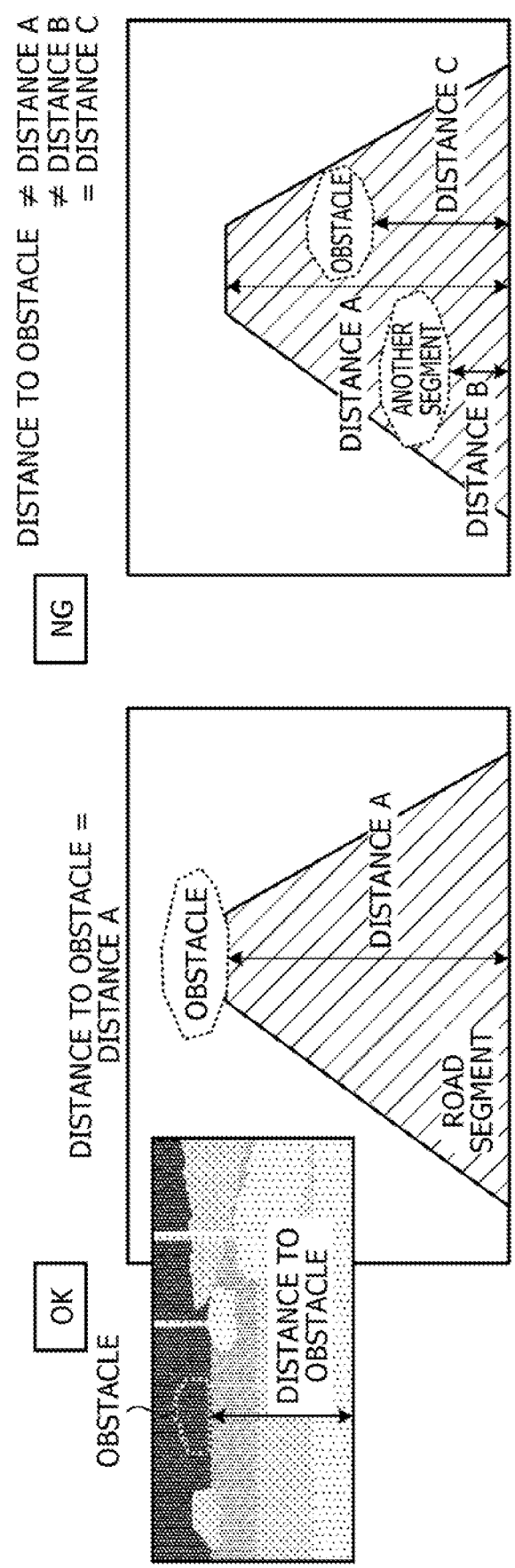
FIG. 7 is a diagram for explaining a problem in the position identification.

FIG. 7 is a diagram for explaining a problem in position identification. As illustrated in the left portion of FIG. 7, in a case where an obstacle exists at the top of the road segment, the Information processing apparatus 1 can determine the position of the obstacle using the depth of the top of the road segment as the depth of the obstacle. In other words, for example, the information processing apparatus 1 can identify a position at a distance A in the depth direction from the lower portion toward the upper portion in a depth image as the position of the obstacle.

On the other hand, as illustrated in the right portion of FIG. 7, in a case where the obstacle does not exist at the top of the road segment, in other words, for example, in a case where the obstacle exists in a part of the road, the information processing apparatus 1 cannot determine in which part of the road segment the obstacle is positioned. For example, it is difficult for the information processing apparatus 1 to identify a position of another segment on the road positioned at a distance B in the depth direction from the lower portion toward the upper portion in the depth image and a position of an obstacle positioned at a distance C.

Figure 8:
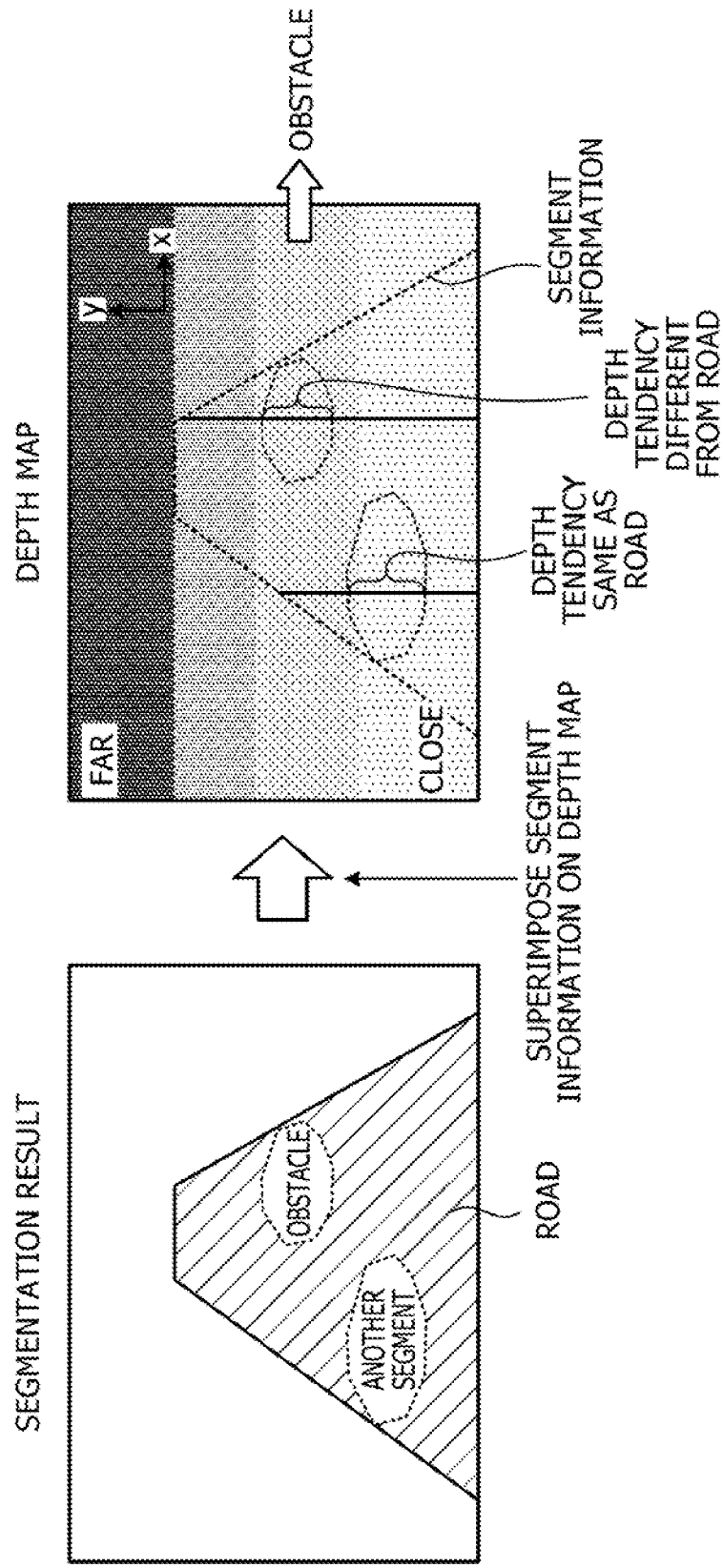
FIG. 8 is a diagram for explaining depth characteristics of a road.

Here, depth characteristics of a road will be described with reference to FIG. 8. FIG. 8 is a diagram for explaining the depth characteristics of the road. In the left portion of FIG. 8, a segmentation result of a road segment estimated from photograph data that is RGB image data is illustrated. Another segment and an obstacle are detected in the road segment.

Then, in the right portion of FIG. 8, a result obtained by superimposing segment information on a depth map estimated from the same photograph data is illustrated. As illustrated in the right portion of FIG. 8, the depth of the road continuously increases from the lower portion toward the upper portion of the depth map. The depth of the obstacle has a depth tendency different from the depth of the road segment. The depth of the another segment has a depth tendency same as the depth of the road segment. The depth tendency is indicated, for example, by depth displacement information.

Therefore, it is possible to determine whether or not an obstacle exists from the depth tendency. Therefore, in the second embodiment, the information processing apparatus 1 will be described that estimates the position of the obstacle using the depth characteristics of the road.

Figure 9:
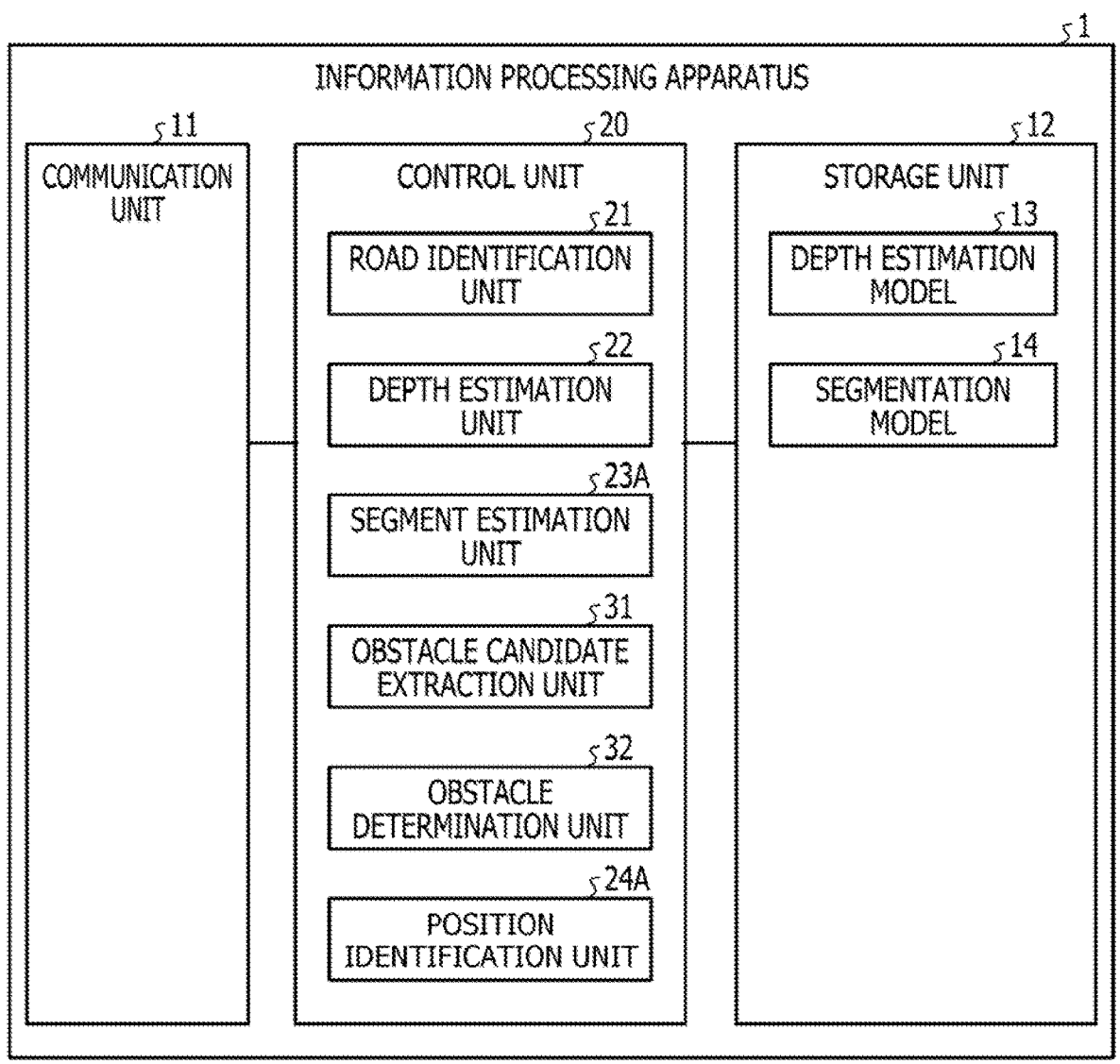
FIG. 9 is a functional block diagram illustrating a functional configuration of an information processing apparatus according to a second embodiment.

FIG. 9 is a functional block diagram illustrating a functional configuration of an information processing apparatus according to the second embodiment. Note that a component identical to that of the information processing apparatus 1 according to the first embodiment illustrated in FIG. 2 is denoted with the same reference numeral, and description regarding the overlapped configuration and operation of the component will be omitted. The first embodiment is different from the second embodiment in that an obstacle candidate extraction unit 31 and an obstacle determination unit 32 are added. Furthermore, the first embodiment is different from the second embodiment in that the segment estimation unit 23 is changed to a segment estimation unit 23A and the position Identification unit 24 is changed to a position identification unit 24A.

The segment estimation unit 23A estimates a road segment from photograph data using a segmentation model 14. For example, the segment estimation unit 23A inputs RGB image data into the segmentation model 14 and estimates segment information including a road from the segmentation model 14. Then, the segment estimation unit 23A extracts an outline of the road segment to be analyzed on the basis of the segment information. As an example, the segment estimation unit 23A labels each pixel group (connected region) corresponding to the road segment and extracts an outline of a road segment that comes out from the bottom of the photograph on the basis of labeling. Then, the segment estimation unit 23A estimates an inner side of the extracted outline of the road segment as a road to be analyzed and an outer side of the extracted outline of the road segment as a portion not to be analyzed. In other words, for example, the segment estimation unit 23A uses that an evacuee images the photograph on the road and sets the road that comes out from the bottom of the photograph as the road to be analyzed.

The obstacle candidate extraction unit 31 extracts an obstacle candidate in the road segment. For example, in a case where another segment exists in the road segment, the obstacle candidate extraction unit 31 sets the another segment in the road segment as an obstacle candidate segment and calculates coordinates (x-axis pixel value and y-axis pixel value) of the obstacle candidate segment. Then, the obstacle candidate extraction unit 31 maps road segment information on a depth map. Then, the obstacle candidate extraction unit 31 executes the following processing on each obstacle candidate segment. In other words, for example, the obstacle candidate extraction unit 31 extracts depth data of the obstacle candidate and extracts depth data of the road segment related to the obstacle candidate. The depth data here indicates a depth value corresponding to the coordinates (x-axis pixel value and y-axis pixel value). The road segment related to the obstacle candidate here indicates road segments before and after the obstacle candidate. Note that the obstacle candidate in the road segment is an example of a second region. The road segment related to the obstacle candidate is an example of a first region.

The obstacle determination unit 32 determines whether or not the obstacle candidate segment is a detection target obstacle segment on the basis of a change in the depth of the road segment related to the obstacle candidate and a change in the depth of the obstacle candidate segment. For example, the obstacle determination unit 32 calculates the change in the depth of the road segment related to the obstacle candidate from the depth data. The obstacle determination unit 32 calculates the change in the depth of the obstacle candidate segment from the depth data. The obstacle determination unit 32 statistically determines whether or not the obstacle candidate segment is a road or an obstacle on the basis of the change in the depth of the road segment related to the obstacle candidate and the change in the depth of the obstacle candidate segment. As an example, the obstacle determination unit 32 converts the depth data of the road segment related to the obstacle candidate into a linear regression equation used for a statistical significant difference test. The obstacle determination unit 32 converts the depth data of the obstacle candidate segment into the linear regression equation used to perform a statistical significant difference test. Then, the obstacle determination unit 32 determines whether or not there is a significant difference on the basis of the two linear regression equations. In a case where there is a significant difference, the obstacle determination unit 32 determines that the obstacle candidate segment is an obstacle segment. In a case where there is no significant difference, the obstacle determination unit 32 determines that the obstacle candidate segment is a road segment. Note that, if the significant difference is equal to or more than a predetermined threshold, the obstacle determination unit 32 may determine that the obstacle candidate segment is an obstacle segment.

The position identification unit 24A identifies a position of a devastated place (obstacle) from the imaging position and the depth immediately below the obstacle. For example, in a case where the obstacle segment exists in the road segment, the position identification unit 24A acquires the depth of the road segment immediately below the obstacle segment. In a case where the obstacle segment does not exist in the road segment, the position identification unit 24A acquires the depth of the top of the road segment. Then, the position identification unit 24A identifies the position of the devastated place from the imaging position and the obtained depth. Then, the position identification unit 24A associates the photograph data (RGB image data) with the identified position on map data of an evacuation application.

Figure 10:
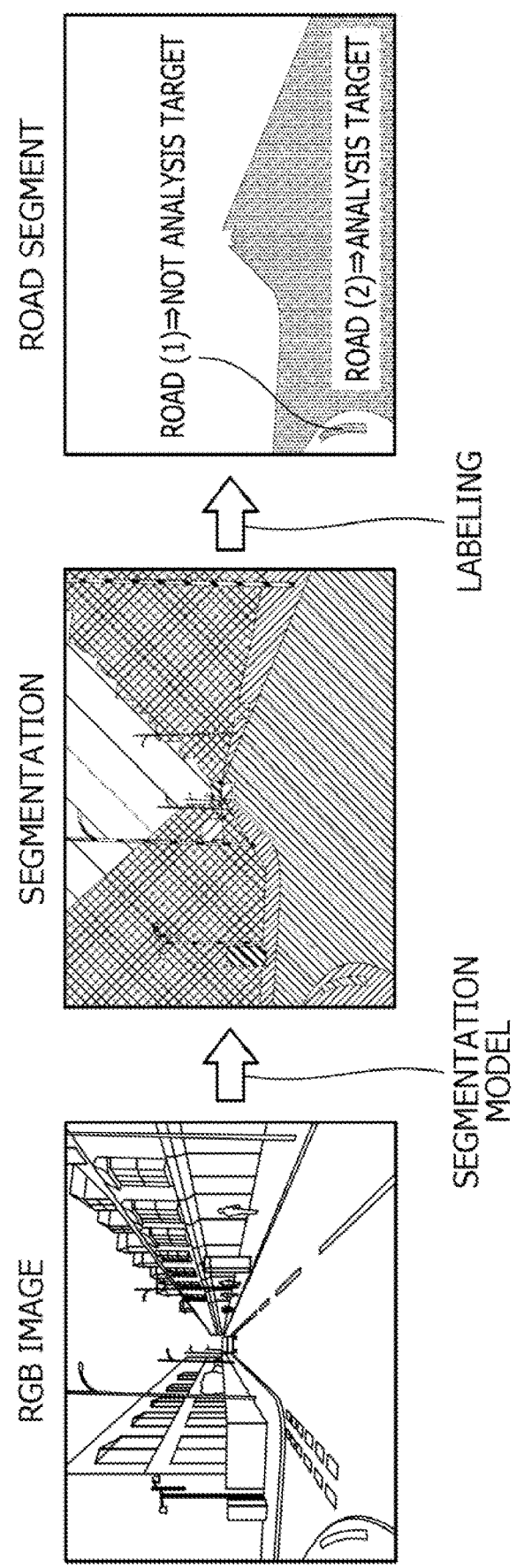
FIG. 10 is a diagram for explaining photographic segment estimation according to the second embodiment.

FIG. 10 is a diagram for explaining photograph segment estimation according to the second embodiment. As illustrated in FIG. 10, the segment estimation unit 23A uses detection of a road using an image segmentation (semantic segmentation). In other words, for example, the segment estimation unit 23A estimates various types of segment Information including roads using the segmentation model 14 from the RGB image data.

Then, the segment estimation unit 23A extracts an outline of the road segment to be analyzed on the basis of the segment information. As an example, the segment estimation unit 23A labels each pixel group (connected region) corresponding to the road segment and extracts an outline of a road segment that comes out from the bottom of the photograph on the basis of labeling. Then, the segment estimation unit 23A estimates an inner side of the extracted outline of the road segment as a road to be analyzed and an outer side of the extracted outline of the road segment as a portion not to be analyzed. Here, a road (2) indicating the inner side of the outline of the road segment that comes out from the bottom of the photograph is estimated as a road to be analyzed. Furthermore, a road (1) indicating the outer side of the outline of the road segment that comes out from the bottom of the photograph is estimated as a road that is not an analysis target.

Figure 11:
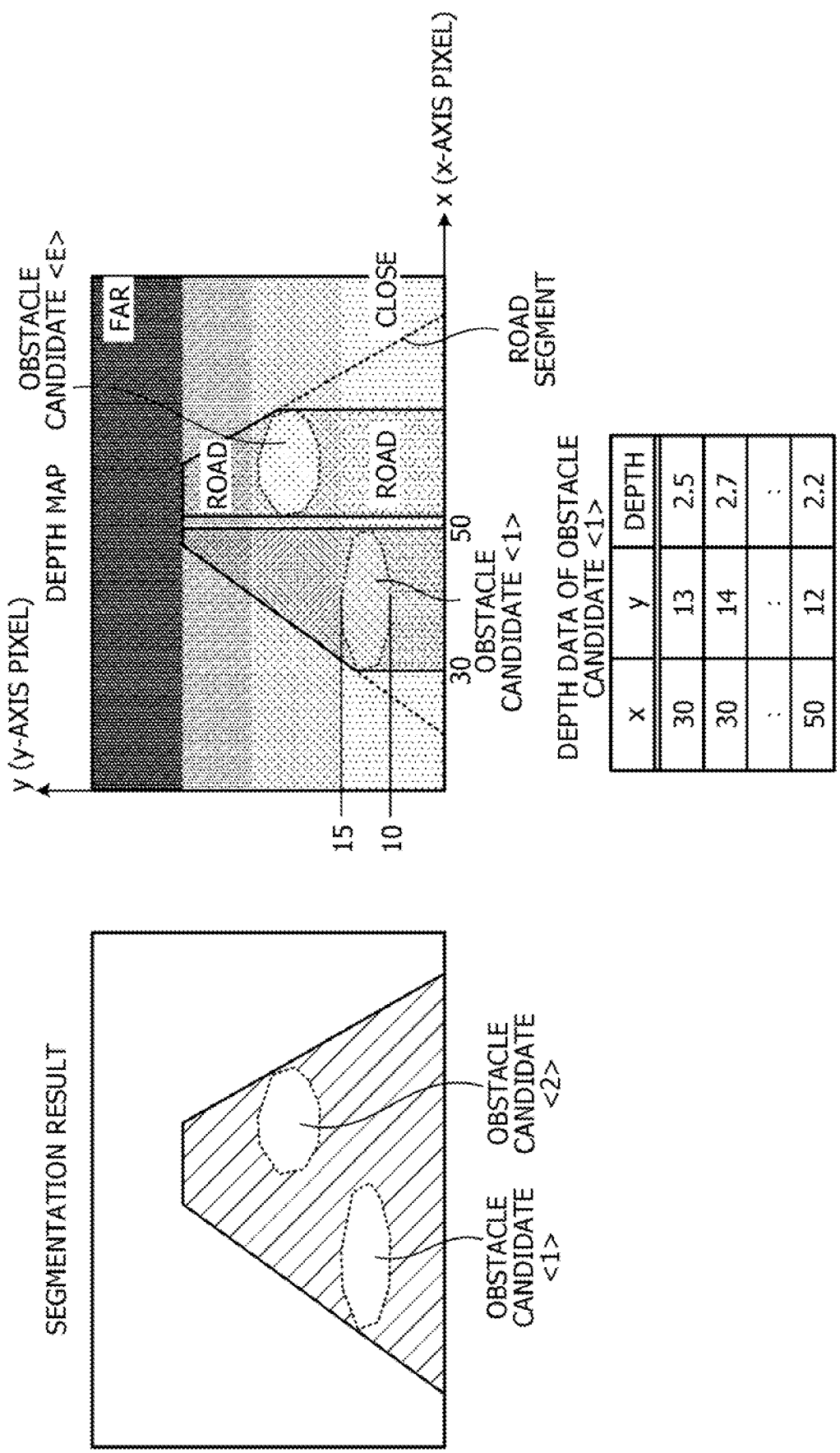
FIG. 11 is a diagram for explaining obstacle candidate extraction according to the second embodiment.

FIG. 11 is a diagram for explaining obstacle candidate extraction according to the second embodiment. In the left portion of FIG. 11, a segmentation result of the road to be analyzed is illustrated. In a case where another segment exists in the road segment, the obstacle candidate extraction unit 31 identifies the another segment in the road segment as an obstacle candidate. Here, an obstacle candidate <1> and an obstacle candidate <2> are identified in the segment of the road to be analyzed. Then, the obstacle candidate extraction unit 31 calculates coordinates (x-axis pixel value and y-axis pixel value) of the obstacle candidate.

In the right portion of FIG. 11, a depth map illustrating a result obtained by mapping road segment information illustrated in the left portion of FIG. 11 on the depth map is illustrated. In the depth map, a distance increases from the lower portion toward the upper portion. The obstacle candidate extraction unit 31 executes the following processing on each obstacle candidate. In other words, for example, the obstacle candidate extraction unit 31 extracts depth data of the obstacle candidate from the depth map and extracts depth data of the road segment related to the obstacle candidate. Here, the obstacle candidate <1> and the obstacle candidate <2> are illustrated. Depth data of the obstacle candidate <1> of these is illustrated in the lower right portion of FIG. 11 as an example. For example, in a case where the x-axis pixel is "30" and the y-axis pixel is "13", "2.5" is set as a depth. In a case where the x-axis pixel is "50" and the y-axis pixel is "12", "2.2" is set as a depth.

Figure 12A:
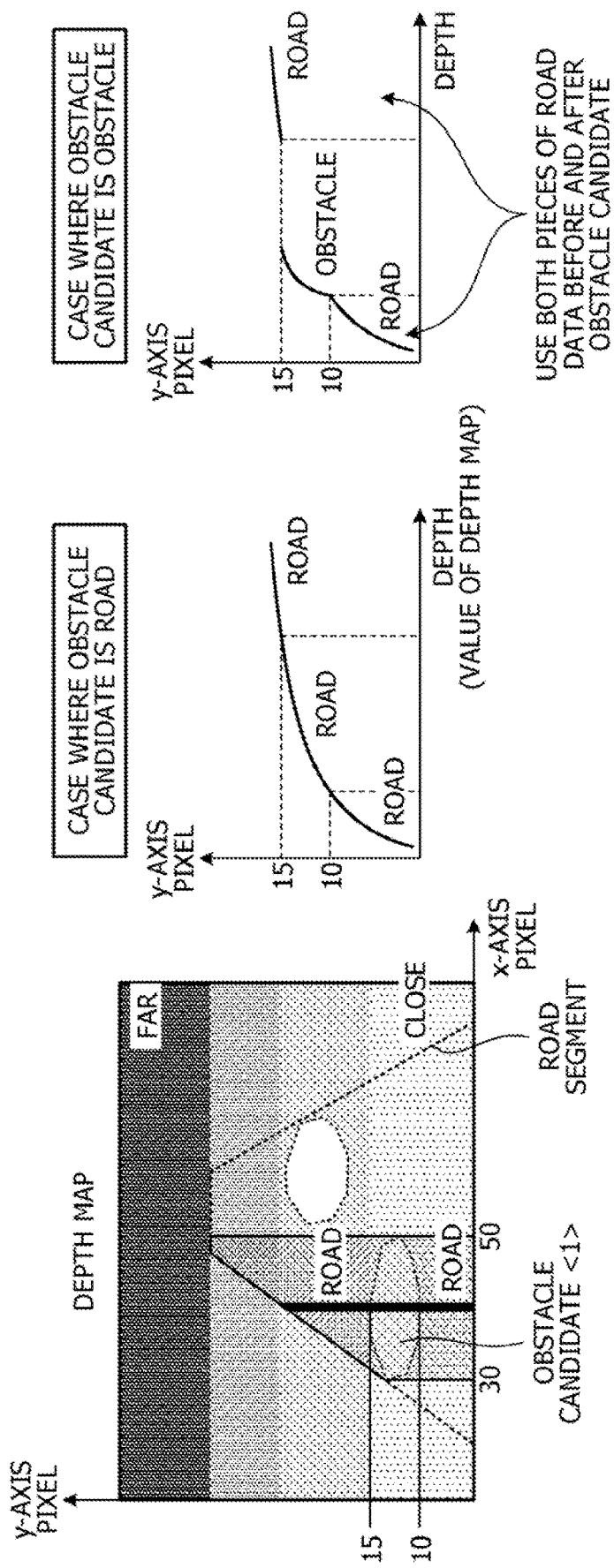
FIG. 12A is a diagram (1) for explaining obstacle determination according to the second embodiment.

FIGS. 12A and 12B are diagrams for explaining obstacle determination according to the second embodiment. In the left portion of FIG. 12A, the depth map illustrated in the right portion of FIG. 11 is illustrated. Here, the obstacle candidate <1> will be described as an example. The obstacle determination unit 32 statistically determines whether or not the obstacle candidate <1> is a road or an obstacle on the basis of a change in a depth of a road segment related to the obstacle candidate <1> and a change in a depth of the obstacle candidate <1>. As an example, the obstacle determination unit 32 determines whether or not the obstacle candidate <1> is a road or an obstacle by comparing road segments before and after the obstacle candidate <1> and a depth corresponding to a certain x-axis pixel value and a shape of a function of the y-axis pixel of the obstacle candidate <1>. This is because of the characteristics of the road depth that continuously increases with respect to the y-axis pixel of the depth map. In other words, for example, this is because of the characteristics of the road depth that continuously increases from the lower portion toward the upper portion of the depth map. Note that it is sufficient that the certain x-axis pixel value be, for example, an intermediate value of the x-axis pixel value constituting the obstacle candidate <1>.

Therefore, in a case where the obstacle candidate <1> is a road, as illustrated in the middle portion of FIG. 12A, the shapes of the functions are the same (no statistical significant difference between depth changes). Therefore, the obstacle determination unit 32 determines that the obstacle candidate is a road. On the other hand, in a case where the obstacle candidate <1> is an obstacle, as illustrated in the right portion of FIG. 12A, the shapes of the functions are different from each other (there is statistical significant difference between depth changes). Therefore, the obstacle determination unit 32 determines that the obstacle candidate is an obstacle.

An example of an obstacle determination method will be described with reference to FIG. 12B. First, a function indicating a relationship between a depth and a y-axis pixel is indicated by the following formula (1) in perspective. Then, the formula (1) has, for example, the shape of the graph illustrated in FIG. 12B. Note that x indicates a depth, and y Indicates a y-axis pixel value of the depth map.

[Expression 1]

$$y = \sum_{x=1}^{N} \frac{2}{x(x+1)} \qquad (1)$$

Here, the formula (1) is approximated to a non-linear regression equation as indicated in the following formula (2) to use the formula (1) for determination of an obstacle. Note that x indicates a depth, and y indicates a y-axis pixel value of the depth map. Furthermore, references a and b indicate regression coefficients.

[Expression 2]

$$y \approx a - \frac{b}{x} \quad (a \text{ and } b \text{ are regression coefficients}) \qquad (2)$$

Moreover, to perform a statistical significant difference test, the formula (2) is converted into a linear regression equation as indicated in the following formula (3). Then, the formula (3) has, for example, the shape of the graph illustrated in FIG. 12B.

[Expression 3]

$$y' = yx = ax - b \qquad (3)$$

The obstacle determination unit 32 converts the depth data of the road segments before and after the obstacle candidate <1> into the linear regression equation of the formula (3). The obstacle determination unit 32 converts the depth data of the obstacle candidate <1> into the linear regression equation of the formula (3). Then, the obstacle determination unit 32 determines whether or not there is a significant difference on the basis of the two linear regression equations. Here, the graph Illustrated in the lower left portion of FIG. 12B is a linear regression equation corresponding to the road segments before and after the obstacle candidate <1>. The graph illustrated in the lower right portion of FIG. 12B is a linear regression equation corresponding to the obstacle candidate <1>.

If there is a significant difference, the obstacle determination unit 32 determines that the obstacle candidate <1> is an obstacle. If there is no significant difference, the obstacle determination unit 32 determines that the obstacle candidate <1> is a road.

Figure 13A:
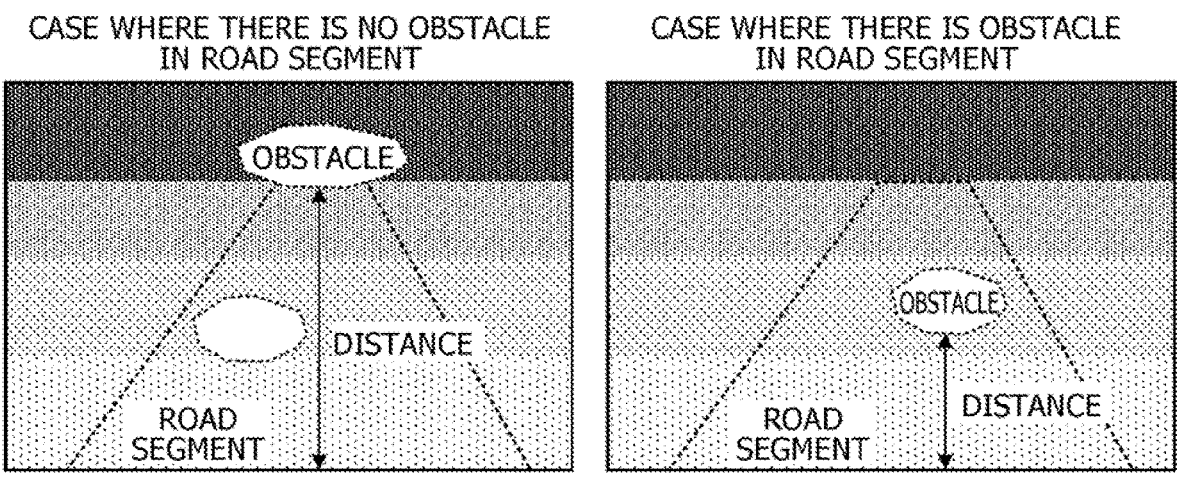
FIG. 13A is a diagram (1) for explaining position Identification according to the second embodiment.
Figure 13B:
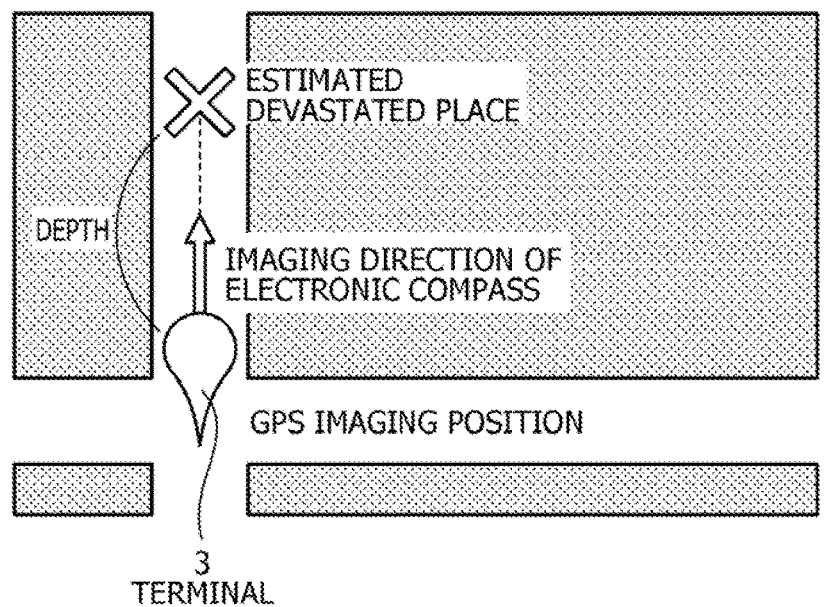
FIG. 13B is a diagram (2) for explaining the position identification according to the second embodiment.

FIGS. 13A and 13B are diagrams for explaining position identification according to the second embodiment. As illustrated in the left portion of FIG. 13A, in a case where there is no obstacle in the road segment, the position Identification unit 24A acquires the depth (distance) of the top of the road segment from the depth map. Furthermore, as illustrated in the right portion of FIG. 13A, in a case where there is an obstacle in the road segment, the position identification unit 24A acquires the depth (distance) of the road segment immediately below the obstacle.

FIG. 13B illustrates an image of a map of an evacuation assistance application. As illustrated in FIG. 13B, regarding a road corresponding to an imaging direction of an electronic compass, the position identification unit 24A estimates the depth (distance) of the devastated place from the GPS imaging position from the GPS imaging position and the depth to the obstacle obtained from the depth map. As a result, the position identification unit 24A identifies the position of the devastated place. For example, the position identification unit 24A adds the GPS imaging position and the estimated depth (distance) and identifies the position of the devastated place.

Figure 14:
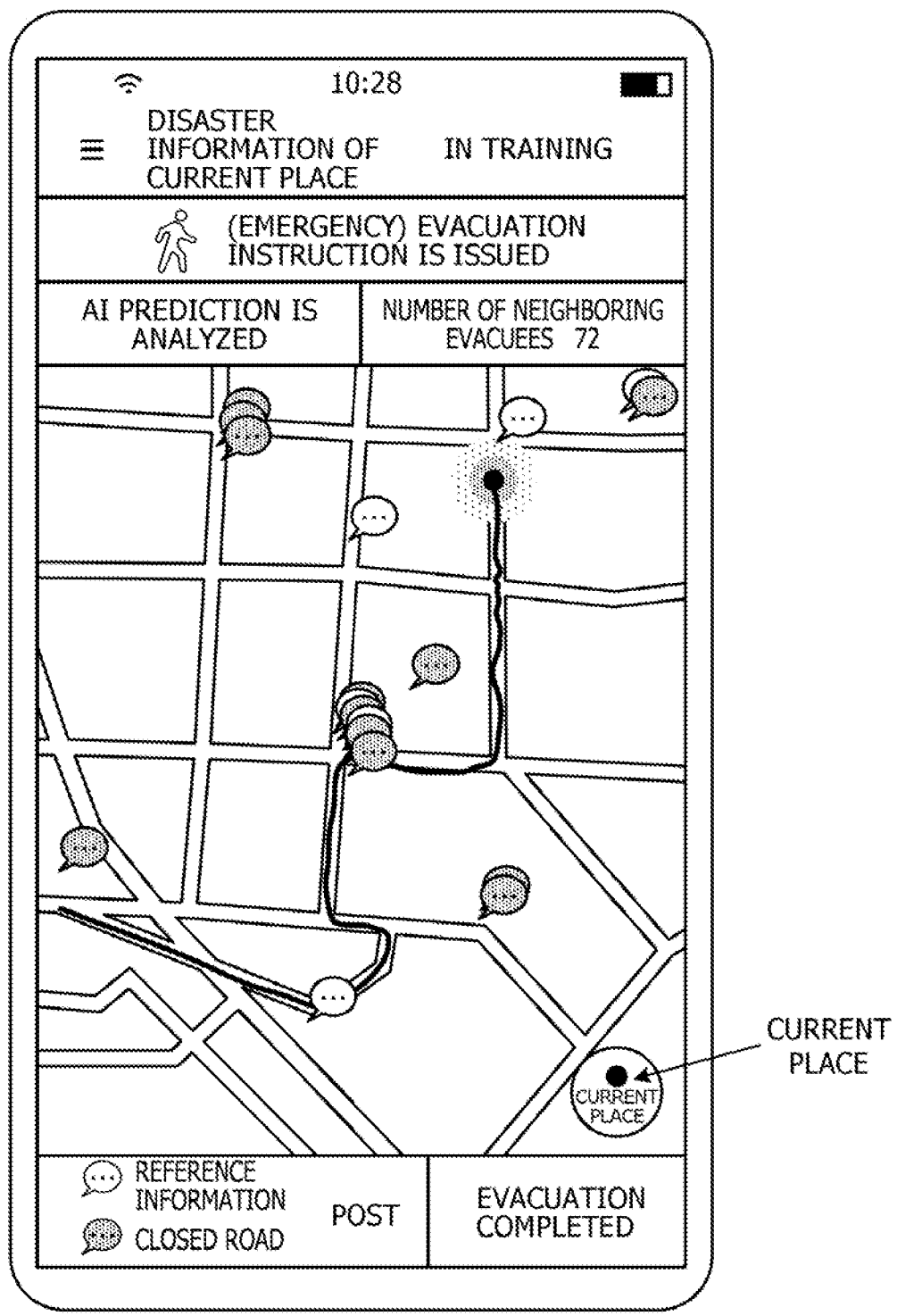
FIG. 14 is a diagram illustrating a display example of an obstacle displayed on a terminal of a disaster victim.

FIG. 14 is a diagram illustrating a display example of an obstacle displayed on a terminal of a disaster victim. In FIG. 14, the position of the devastated place where an obstacle exists on a road is displayed on the map data of the evacuation assistance application. Photograph data is associated with the position of the devastated place on the map data. Here, a position of a black-painted balloon is the position of the devastated place on the road, it is not possible to currently pass through the position. As a result, by displaying the accurate position of the devastated place, the evacuation assistance application can share a damage situation with local residents and can assist evacuation more safely.

Figure 15A:
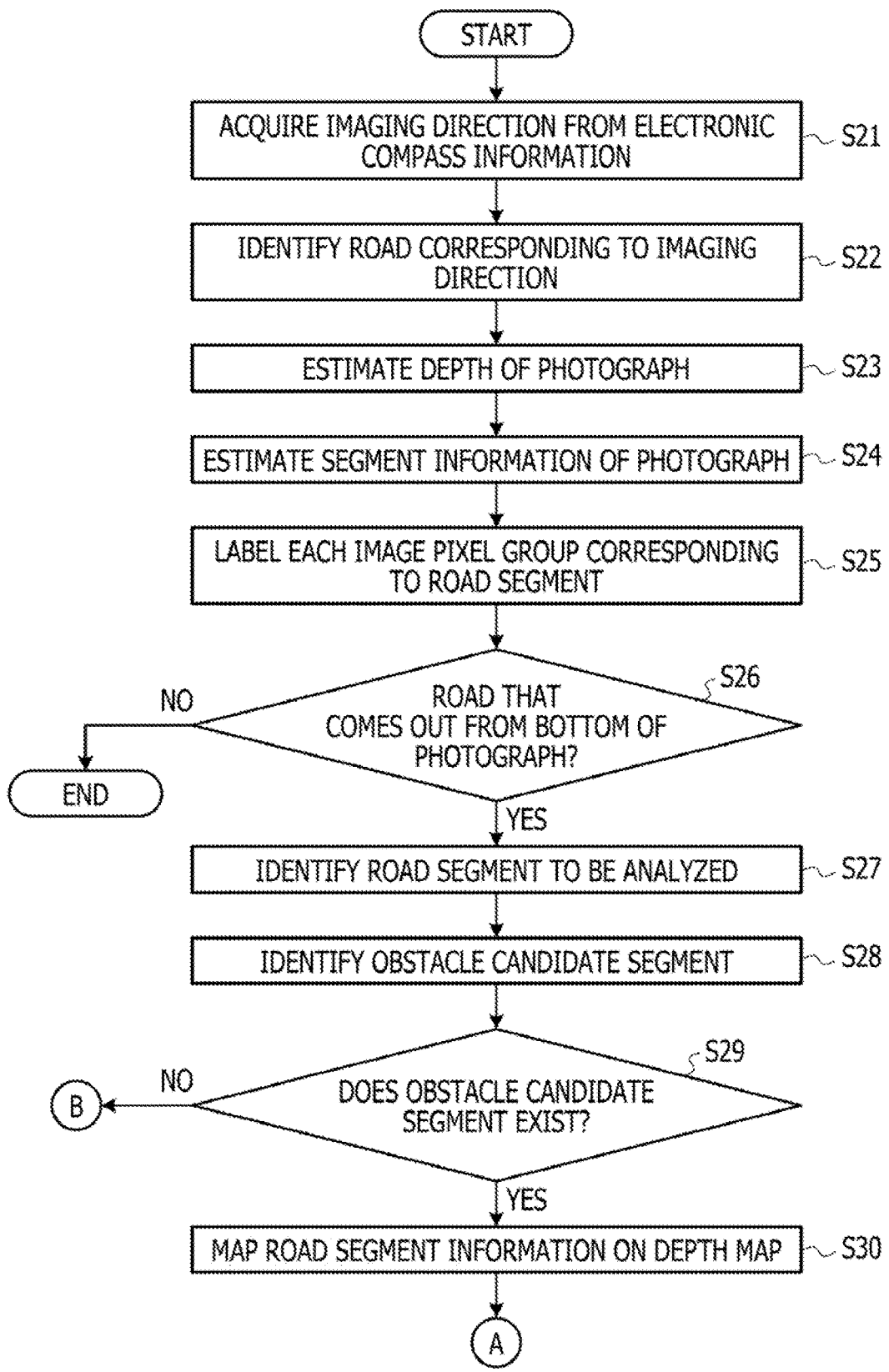
FIGS. 15A and 15B are a diagram Illustrating an example of a flowchart of position identification processing according to the second embodiment.
Figure 15B:
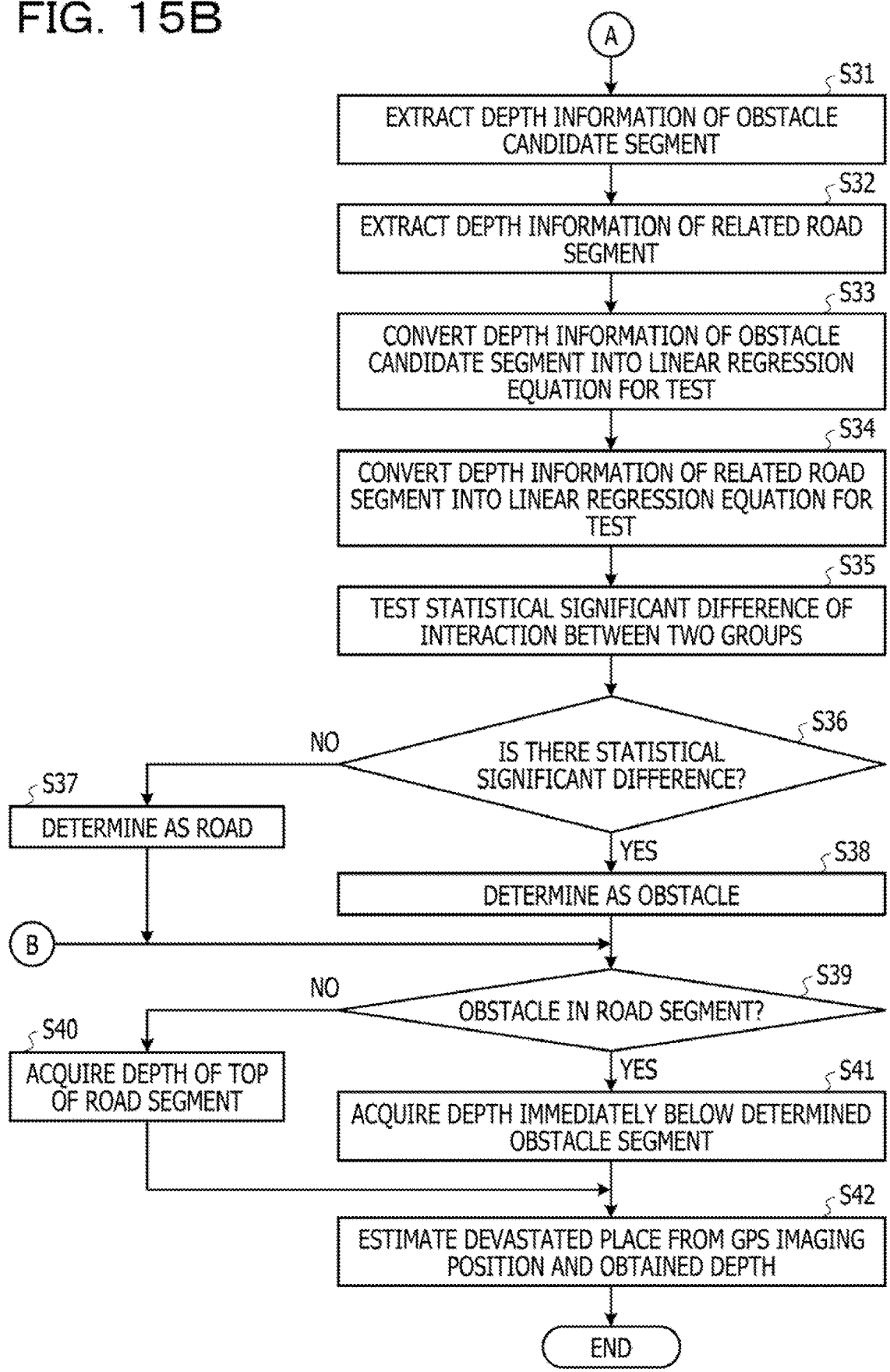

FIGS. 15A and 15B are a diagram Illustrating an example of a flowchart of position identification processing according to the second embodiment. Note that it is assumed that the Information processing apparatus 1 acquire the photograph data, the GPS imaging position, and the electronic compass information of the devastated place from the terminal 3. As illustrated in FIGS. 15A and 15B, the road identification unit 21 acquires an imaging direction from electronic compass information (step S21). The road identification unit 21 identifies a road corresponding to the imaging direction (step S22).

Subsequently, the depth estimation unit 22 estimates a depth of the photograph (step S23). For example, the depth estimation unit 22 estimates a depth map of the photograph from the photograph data that is RGB image data using the depth estimation model 13.

Then, the segment estimation unit 23 estimates segment information of the photograph (step S24). For example, the segment estimation unit 23 estimates a segment corresponding to the photograph data that is the RGB image data using the segmentation model 14.

Then, the segment estimation unit 23A labels each image pixel group corresponding to a road segment obtained from the segment information (step S25). For example, the segment estimation unit 23A labels each pixel group (connected region) corresponding to the road segment on the basis of the segment information.

Then, the segment estimation unit 23A determines a road that comes out from the bottom of the photograph on the basis of labeling (step S26). For example, the segment estimation unit 23A extracts an outline of the road segment on the basis of labeling. Then, the segment estimation unit 23A determines a road segment that comes out from the bottom of the photograph according to the outline of the road segment. In a case where it is determined that no road comes out from the bottom of the photograph (No in step S26), the segment estimation unit 23A ends the position identification processing.

On the other hand, in a case where it is determined that there is a road that comes out from the bottom of the photograph (Yes in step S26), the segment estimation unit 23A identifies the road segment that comes out from the bottom of the photograph as a road segment to be analyzed (step S27).

Then, the obstacle candidate extraction unit 31 identifies an obstacle candidate segment in the road segment to be analyzed (step S28). For example, in a case where another segment exists in the road segment, the obstacle candidate extraction unit 31 identifies the another segment in the road segment as an obstacle candidate segment. Then, the obstacle candidate extraction unit 31 determines whether or not the obstacle candidate segment exists (step S29). In a case where it is determined that the obstacle candidate segment does not exist (No in step S29), the obstacle candidate extraction unit 31 proceeds to step S39.

On the other hand, in a case where it is determined that the obstacle candidate segment exists (Yes in step S29), the obstacle determination unit 32 maps road segment information to be analyzed on the depth map (step S30). Then, the obstacle determination unit 32 extracts depth Information of the obstacle candidate segment (step S31). Then, the obstacle determination unit 32 extracts the depth information of the road segment related to the obstacle candidate segment (step S32).

The obstacle determination unit 32 converts the depth information of the obstacle candidate segment into linear regression equation information for a statistical significant difference test (step S33). The obstacle determination unit 32 converts the depth information of the road segment related to the obstacle candidate segment into linear regression equation Information for a statistical significant difference test (step S34).

Then, the obstacle determination unit 32 tests a statistical significant difference of an interaction between two groups (step S35). Then, the obstacle determination unit 32 tests a statistical significant difference on the basis of the two pieces of linear regression equation information. Then, the obstacle determination unit 32 determines whether or not there is a statistical significant difference (step S36). In a case where it is determined that there is no statistical significant difference (No in step S36), the obstacle determination unit 32 determines that the obstacle candidate segment is a road (step S37). Then, the obstacle determination unit 32 proceeds to step S39.

On the other hand, in a case where it is determined that there is a statistical significant difference (Yes in step S36), the obstacle determination unit 32 determines that the obstacle candidate segment is an obstacle (step S38). Then, the obstacle determination unit 32 proceeds to step S39.

Then, the position Identification unit 24A determines whether or not an obstacle exists in the road segment to be analyzed (step S39). In a case where it is determined that there is no obstacle in the road segment (No in step S39), the position identification unit 24A acquires the depth of the top of the road segment from the depth map (step S40). Then, the position identification unit 24A proceeds to step S42.

On the other hand, in a case where it is determined that an obstacle exists in the road segment (Yes in step S39), the position identification unit 24A acquires the depth of the road segment immediately below the obstacle segment that is determined as an obstacle (step S41). Then, the position identification unit 24A proceeds to step S42.

In step S42, the position identification unit 24A estimates the position of the devastated place from the GPS imaging position and the acquired depth (step S42). Then, the position identification unit 24A ends the position identification processing.

Figure 16A:
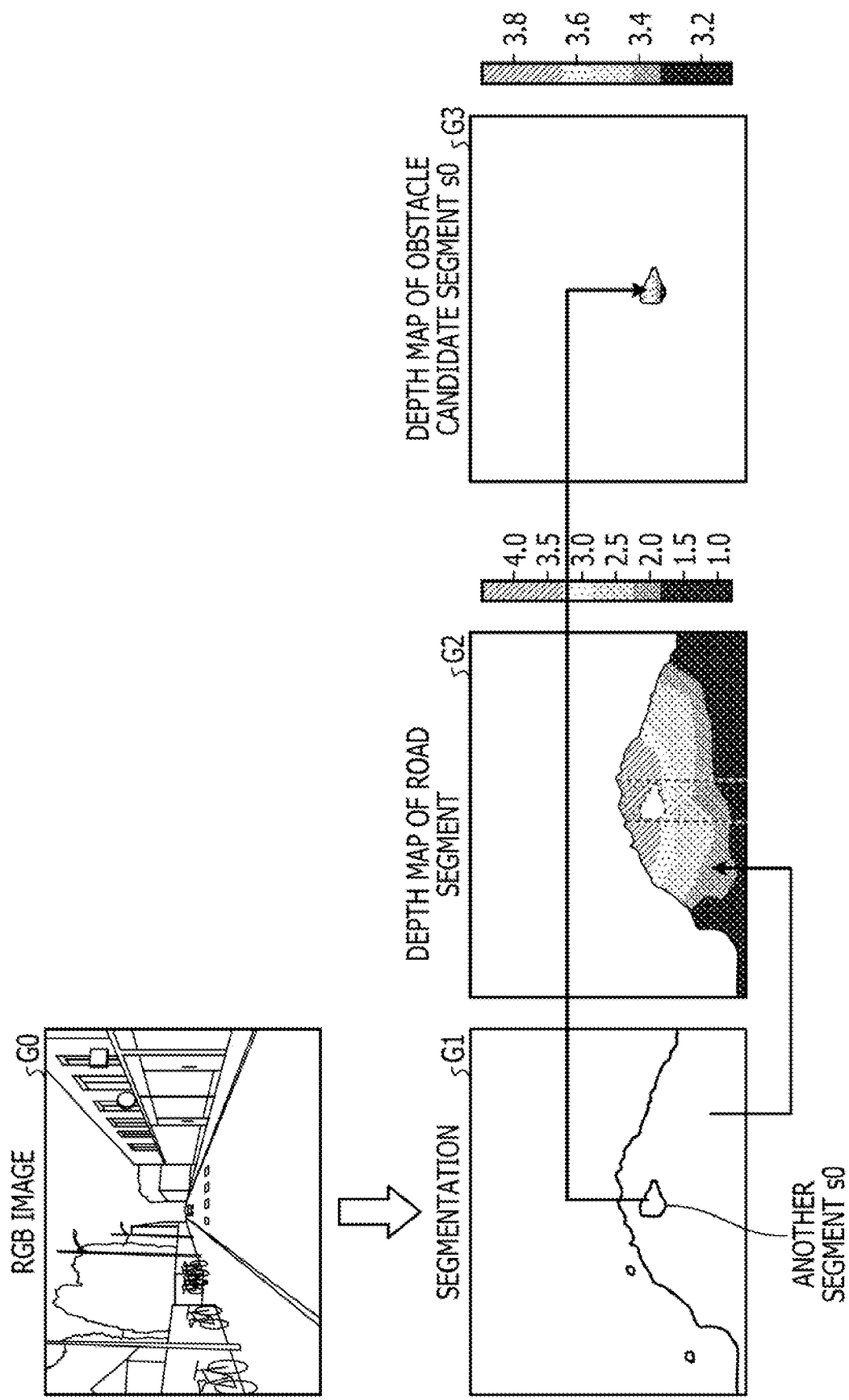
FIG. 16A is a diagram (1) for explaining a case where the position identification according to the second embodiment is evaluated using a sample photograph.
Figure 16B:
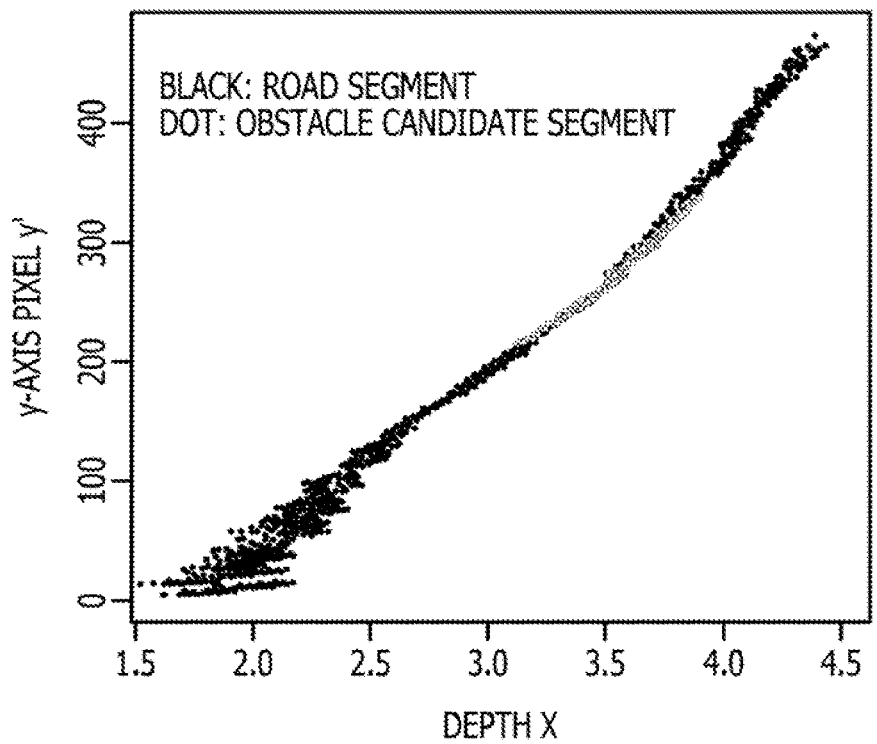
FIG. 16B is a diagram (2) for explaining a case where the position identification according to the second embodiment is evaluated using the sample photograph.
Figure 16C:
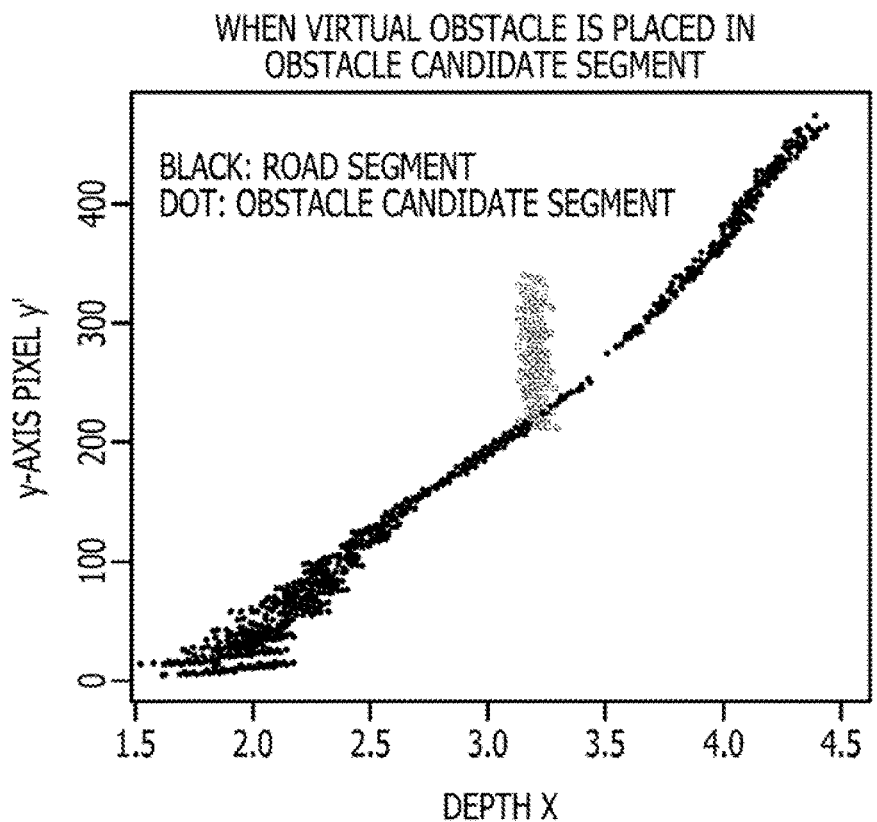
FIG. 16C is a diagram (3) for explaining a case where the position identification according to the second embodiment is evaluated using the sample photograph.

FIGS. 16A to 16C are diagrams for explaining a case where the position identification according to the second embodiment is evaluated using a sample photograph. As illustrated in the left portion of FIG. 16A, the segment estimation unit 23A estimates various types of segment information including roads using the segmentation model 14 from an RGB image G0 that is a sample photograph and extracts a road segment that comes out from the bottom of the photograph on the basis of various types of segment information. An image G1 is an image obtained by extracting a road segment from various types of segment information. Then, in a case where another segment exists in the extracted road segment, the obstacle candidate extraction unit 31 identifies the another segment in the road segment as an obstacle candidate. Here, another segment s0 is identified as an obstacle candidate in the road segment.

As illustrated in the middle portion of FIG. 16A, the obstacle candidate extraction unit 31 maps the road segment information on a depth map corresponding to the RGB image G0 and acquires a depth map G2 of the road segment. Furthermore, as illustrated in the right portion of FIG. 16A, the obstacle candidate extraction unit 31 maps the road segment information on the depth map corresponding to the RGB Image G0 and acquires a depth map G3 of the obstacle candidate segment.

Then, the obstacle determination unit 32 statistically determines whether or not an obstacle candidate segment s0 is a road or an obstacle on the basis of a change in a depth of a road segment related to the obstacle candidate segment s0 and a change in a depth of the obstacle candidate segment s0. For example, the obstacle determination unit 32 converts depth data of the road segments, before and after the obstacle candidate segment, corresponding to the x-axis pixel included in the obstacle candidate segment s0 into the linear regression equation of the formula (3). The obstacle determination unit 32 converts the depth data of the obstacle candidate s0 into the linear regression equation of the formula (3).

Then, the obstacle determination unit 32 determines whether or not there is a significant difference on the basis of the two linear regression equations. In a case where there is a significant difference, the obstacle determination unit 32 determines that the obstacle candidate segment s0 is an obstacle. In a case where there is no significant difference, the obstacle determination unit 32 determines that the obstacle candidate segment s0 is a road. As illustrated in FIG. 16B, graphs corresponding to the two linear regression equations are illustrated. Here, the black graph is a graph of the linear regression equation of the road segment related to the obstacle candidate segment s0. The gray graph is a graph of the linear regression equation of the obstacle candidate segment s0. The graphs corresponding to the two linear regression equations have the same depth tendency. Then, because a P value indicating a significant difference is 0.518, the obstacle determination unit 32 determines that there is no significant difference. Therefore, because there is no significant difference, the obstacle determination unit 32 determines that the obstacle candidate segment s0 is a road.

Here, the inventor has placed a virtual obstacle in the obstacle candidate segment. Then, the graphs corresponding to two linear regression equations as Illustrated in FIG. 16C are illustrated. The graphs corresponding to the two linear regression equations have different depth tendencies. Then, because the P value indicating the significant difference is $5.08 \times 10^{-10}$, the obstacle determination unit 32 determines that there is a significant difference. Therefore, because there is a significant difference, the obstacle determination unit 32 determines that the obstacle candidate segment is an obstacle.

According to the second embodiment described above, the information processing apparatus 1 acquires the captured image and the depth image that represents the distance from the imaging position and corresponds to the captured image. The information processing apparatus 1 identifies the road region and another region in contact with the road region from the captured image. The information processing apparatus 1 calculates the change in the depth of the first region corresponding to the road region included in the depth image and the change in the depth of the second region corresponding to the another region included in the depth image. The information processing apparatus 1 determines whether or not the another region is a detection target on the basis of the change in the depth of the first region and the change in the depth of the second region. In a case where it is determined that the another region is a detection target, the information processing apparatus 1 identifies a position of a subject included in the another region on the basis of the depth of the second region and the imaging position. As a result, the information processing apparatus 1 can accurately estimate the position of the devastated place by using the changes in the depths of the road region and the another region in contact with the road region. As a result, the information processing apparatus 1 can accurately inform a user of the evacuation assistance application of the devastated place.

Furthermore, according to the second embodiment described above, the information processing apparatus 1 acquires the depth image corresponding to the captured image by inputting the captured image into the machine learning model that outputs the depth image in response to the input of the RGB image. As a result, the information processing apparatus 1 can acquire the accurate depth image corresponding to the captured image by using the machine learning model.

Furthermore, according to the second embodiment described above, regarding the second region corresponding to the another region, in a case where the change in the depth matches the change in the depth of the first region before and after the second region and the change in the depth of the second region corresponding to the second region is different from the change in the depth of the first region, the information processing apparatus 1 determines that the another region is a detection target. As a result, the information processing apparatus 1 can determine tendency of the change in the depth by comparing the changes of the depth of the second region and the depth of the first region before and after the second region.

Furthermore, according to the second embodiment described above, the information processing apparatus 1 calculates the change in the depth of the first region corresponding to the road region and the change in the depth of the second region corresponding to the another region from the lower portion toward the upper portion of the depth image in the depth direction. In a case where the tendency of the change in the second depth is different from the tendency of the change in the first depth by a value equal to or more than a threshold, the information processing apparatus 1 determines that the another region is a detection target. As a result, the information processing apparatus 1 can determine the detection target by using the tendency of the change in the depth.

Furthermore, according to the second embodiment described above, the information processing apparatus 1 calculates the change in the depth of the first region corresponding to the road region and the change in the depth of the second region corresponding to the another region from the lower portion toward the upper portion of the depth image in the depth direction. The information processing apparatus 1 converts each of the change in the depth of the first region and the change in the depth of the second region into the respective pieces of linear regression equation information indicating a relationship between the number of pixels in the depth direction and the depth of the depth image. In a case where there is a statistical significant difference between the pieces of the linear regression equation information, the information processing apparatus 1 determines that the second region is not a detection target, and in a case where there is no statistical significant difference, the information processing apparatus 1 determines that the second region is a detection target. As a result, the information processing apparatus 1 can easily determine whether or not there is a statistical significant difference between the road region (first region) and the second region by using the linear regression equation information indicating the relationship between the depth and the number of y-axis pixels. That is, for example, the information processing apparatus 1 can easily determine whether or not there is a statistical significant difference between the road region (first region) and the second region by using the depth characteristics such that the depth of the road region continuously increases with respect to the number of y-axis pixels in the depth image (depth map).

Furthermore, according to the second embodiment described above, in a case where it is determined that the second region is a detection target on the basis of each piece of the linear regression equation information, the information processing apparatus 1 identifies the position of the subject included in the another region on the basis of the depth of the second region and the imaging position. Then, the information processing apparatus 2 associates the image data of the subject with the position of the subject on the map data. As a result, the information processing apparatus 1 can accurately estimate the position of the second region (devastated place) that is not a road region. As a result, the information processing apparatus 1 can share the devastated place with local residents who use the evacuation assistance application and can assist evacuation more safely.

Furthermore, according to the second embodiment described above, in a case where it is determined that the second region is not a detection target on the basis of each piece of the linear regression equation information, the information processing apparatus 1 identifies the position of the subject on the basis of the depth of the top of the first region and the imaging position. Then, the information processing apparatus 2 associates the image data of the subject with the position of the subject on the map data. As a result, the information processing apparatus 1 can accurately estimate the position of the top of the road region as the devastated place. As a result, the information processing apparatus 1 can share the devastated place with local residents who use the evacuation assistance application and can assist evacuation more safely.

Pieces of information including a processing procedure, a control procedure, a specific name, various types of data, and parameters described above or illustrated in the drawings may be optionally changed unless otherwise specified.

Furthermore, each component of each device illustrated in the drawings is functionally conceptual and does not necessarily have to be physically configured as illustrated in the drawings. In other words, for example, specific forms of distribution and integration of each device are not limited to those illustrated in the drawings. That is, for example, all or a part thereof may be configured by being functionally or physically distributed or integrated in optional units according to various types of loads, usage situations, or the like.

Moreover, all or any part of individual processing functions performed in each device may be implemented by a CPU and a program analyzed and executed by the CPU, or may be implemented as hardware by wired logic.

Figure 17:
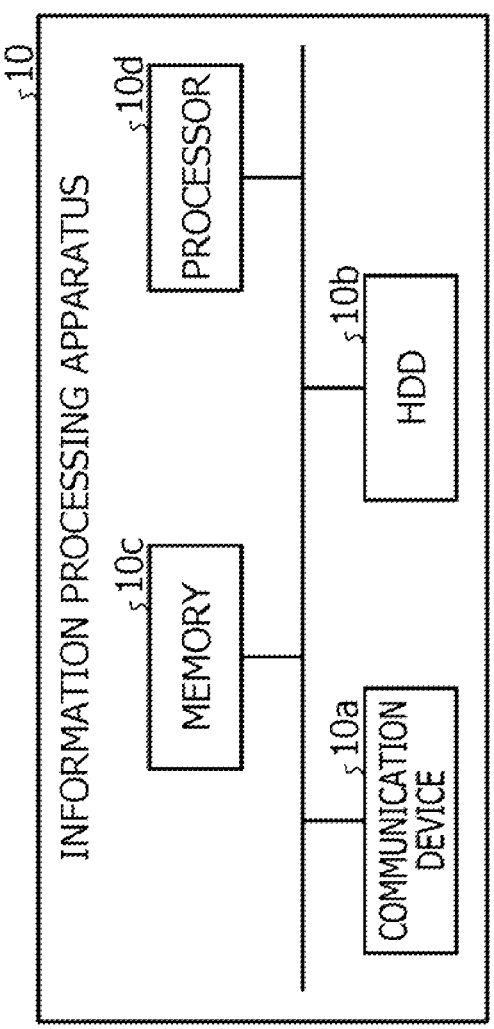
FIG. 17 is a diagram for explaining a hardware configuration example.

FIG. 17 is a diagram for explaining a hardware configuration example. As illustrated in FIG. 17, the information processing apparatus 1 includes a communication device 10a, a hard disk drive (HDD) 10b, a memory 10c, and a processor 10d. Furthermore, the individual units illustrated in FIG. 10 are mutually connected by a bus or the like.

The communication device 10a is a network interface card or the like and communicates with another device. The HDD 10b stores a program that activates the functions illustrated in FIGS. 2 and 9, and a DB.

The processor 10d reads a program that executes processing similar to the processing of each processing unit Illustrated in FIGS. 2 and 9 from the HDD 10b or the like, and develops the read program in the memory 10c, thereby activating a process that executes each function described with reference to FIGS. 2 and 9 or the like. For example, this process implements a function similar to that of each processing unit included in the information processing apparatus 1. Specifically, for example, the processor 10d reads programs having functions similar to the road identification unit 21, the depth estimation unit 22, the segment estimation units 23 and 23A, the obstacle candidate extraction unit 31, the obstacle determination unit 32, the position identification units 24 and 24A, and the like from the HDD 10b and the like. Then, the processor 10d executes a process for executing processing similar to the road identification unit 21, the depth estimation unit 22, the segment estimation units 23 and 23A, the obstacle candidate extraction unit 31, the obstacle determination unit 32, the position identification units 24 and 24A, and the like.

As described above, the information processing apparatus 1 operates as an information processing apparatus that executes a position identification method by reading and executing the programs. Furthermore, the information processing apparatus 1 may also implement functions similar to the functions of the above-described embodiments by reading the program described above from a recording medium by a medium reading device and executing the read program described above. Note that the program mentioned in other embodiments is not limited to being executed by the information processing apparatus 1. For example, the embodiment may be similarly applied to a case where another computer or server executes the program, or a case where these cooperatively execute the program.

This program may be distributed via a network such as the Internet. Furthermore, this program may be recorded on a computer-readable recording medium such as a hard disk, flexible disk (FD), compact disc read only memory (CD-ROM), magneto-optical disk (MO), or digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present Invention have been described in detail, it should be understood that the various changes, substitutions, and alterations could be made hereto without departing from the spirit and scope of the invention.

What is claimed is:

1. A non-transitory computer-readable recording medium storing a position identification program for causing a computer to execute processing comprising:

acquiring a captured image and a depth image that represents a distance from an imaging position and corresponds to the captured image;

identifying a road region and another region in contact with the road region from the captured image;

calculating a change in a depth of a first region that corresponds to the road region included in the depth image and a change in a depth of a second region that corresponds to the another region included in the depth image;

determining whether or not the another region is a detection target on the basis of the change in the depth of the first region and the change in the depth of the second region; and identifying a position of a subject included in the another region on the basis of the depth of the second region and the imaging position in a case where it is determined that the another region is the detection target, wherein the processing of determining includes processing of determining that the another region is the detection target in a case where the change in the depth of the first region before and after the second region matches the second region that corresponds to the another region and the change in the depth of the second region that corresponds to the second region is different from the change in the depth of the first region.

2. The non-transitory computer-readable recording medium storing the position identification program according to claim 1, wherein the processing of acquiring includes processing of acquiring the depth image that corresponds to the captured image by inputting the captured image into a machine learning model that outputs a depth image according to an input of a Red Green Blue (RGB) image.

3. The non-transitory computer-readable recording medium storing the position identification program according to claim 1, wherein the processing of calculating includes processing of calculating a change in a depth of the first region that corresponds to the road region and a change in a depth of the second region that corresponds to the another region from a lower portion toward an upper portion of the depth image in a depth direction, and the processing of determining includes processing of determining that the another region is the detection target in a case where tendency of the change in the depth of the second region is different from tendency of the change in the depth of the first region by a value equal to or more than a threshold.

4. The non-transitory computer-readable recording medium storing the position identification program according to claim 1, wherein the processing of calculating includes processing of calculating a change in a depth of the first region that corresponds to the road region and a change in a depth of the second region that corresponds to the another region from a lower portion toward an upper portion of the depth image in a depth direction and converting each of the change in the depth of the first region and the change in the depth of the second region into each piece of linear regression equation information that indicates a relationship between the number of pixels in the depth direction and a depth of the depth image, and the processing of determining includes processing of determining that the second region is not a detection target in a case where there is a statistical significant difference between the pieces of linear regression equation information and determining that the second region is the detection target in a case where there is no statistical significant difference.

5. The non-transitory computer-readable recording medium storing the position identification program according to claim 4, wherein
the processing of identifying a position of a subject includes
processing of identifying the position of the subject included in the another region on the basis of the depth of the second region and the imaging position in a case where it is determined that the second region is the detection target on the basis of each piece of the linear regression equation information and
processing of associating image data of the subject with a position of the subject on map data.

6. The non-transitory computer-readable recording medium storing the position identification program according to claim 4, wherein
the processing of identifying a position of a subject includes
processing of identifying the position of the subject on the basis of the depth of the top of the first region and the imaging position in a case where it is determined that the second region is not the detection target on the basis of each piece of the linear regression equation information and
processing of associating image data of the subject with a position of the subject on map data.

7. An information processing apparatus comprising:
a memory; and a
processor coupled to the memory and configured to:
acquire a captured image and a depth image that represents a distance from an imaging position and corresponds to the captured image;
identify a road region and another region in contact with the road region from the captured image;
calculate a change in a depth of a first region that corresponds to the road region included in the depth image and a change in a depth of a second region that corresponds to the another region included in the depth image;
determine whether or not the another region is a detection target on the basis of the change in the depth of the first region and the change in the depth of the second region; and
identify a position of a subject included in the another region on the basis of the depth of the second region and the imaging position in a case where it is determined that the another region is the detection target,
wherein a processing to determine includes
processing of determining that the another region is the detection target in a case where the change in the depth of the first region before and after the second region matches the second region that corresponds to the another region and the change in the depth of the second region that corresponds to the second region is different from the change in the depth of the first region.

8. A position identification method comprising:
acquiring, by a computer, a captured image and a depth image that represents a distance from an imaging position and corresponds to the captured image;
identifying a road region and another region in contact with the road region from the captured image;
calculating a change in a depth of a first region that corresponds to the road region included in the depth image and a change in a depth of a second region that corresponds to the another region included in the depth image;
determining whether or not the another region is a detection target on the basis of the change in the depth of the first region and the change in the depth of the second region; and
identifying a position of a subject included in the another region on the basis of the depth of the second region and the imaging position in a case where it is determined that the another region is the detection target,
wherein the determining includes
processing of determining that the another region is the detection target in a case where the change in the depth of the first region before and after the second region matches the second region that corresponds to the another region and the change in the depth of the second region that corresponds to the second region is different from the change in the depth of the first region.

* * * * *